United States Patent
Jang

(10) Patent No.: US 12,449,938 B2
(45) Date of Patent: Oct. 21, 2025

(54) TOUCH DISPLAY DEVICE AND WEIGHTED TOUCH SENSING METHOD OF TOUCH CONTROLLER

(71) Applicant: LG Display Co., Ltd., Seoul (KR)

(72) Inventor: HyunWoo Jang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/144,513

(22) Filed: May 8, 2023

(65) Prior Publication Data

US 2023/0367425 A1 Nov. 16, 2023

(30) Foreign Application Priority Data

May 11, 2022 (KR) .................. 10-2022-0057965

(51) Int. Cl.
*G06F 3/041* (2006.01)
*G06F 3/044* (2006.01)

(52) U.S. Cl.
CPC ........ *G06F 3/04186* (2019.05); *G06F 3/0412* (2013.01); *G06F 3/0446* (2019.05)

(58) Field of Classification Search
CPC ...... G06F 3/04186; G06F 3/044; G06F 3/041; G06F 3/0416; G06F 3/0443; G06F 3/0444; G06F 3/0445; G06G 3/0446; G06G 3/0412
See application file for complete search history.

(56) References Cited

U.S. PATENT DOCUMENTS

| | | | | |
|---|---|---|---|---|
| 2011/0061947 A1* | 3/2011 | Krah | ............... | G06F 3/041 713/320 |
| 2014/0118301 A1* | 5/2014 | Cho | ............... | G06F 3/04166 345/174 |
| 2016/0062504 A1* | 3/2016 | Hwang | ............... | G06F 3/0447 345/174 |
| 2016/0085375 A1* | 3/2016 | Park | ............... | G06F 3/0418 345/174 |
| 2016/0188142 A1* | 6/2016 | Oh | ............... | G06F 1/3265 345/87 |
| 2017/0090624 A1* | 3/2017 | Kwon | ............... | G06F 1/3262 |
| 2018/0059832 A1* | 3/2018 | Cho | ............... | G06F 3/0443 |
| 2019/0204971 A1* | 7/2019 | Kang | ............... | G06F 3/0443 |
| 2021/0397341 A1* | 12/2021 | Ye | ............... | G06F 3/0446 |

* cited by examiner

*Primary Examiner* — Sujit Shah
(74) *Attorney, Agent, or Firm* — Fenwick & West LLP

(57) ABSTRACT

A touch display device and a weighted touch sensing method of a touch controller for providing an accurate touch sensing performance and a high quality of image display are disclosed. The touch display device may include a display panel in which a plurality of subpixels are disposed and a plurality of touch electrodes overlapping one or more of the plurality of subpixels are disposed, and a touch driving circuit configured to supply a touch driving signal including a plurality of pulses to one or more of the plurality of touch electrodes, the touch driving circuit configured to output respective touch driving signals having different numbers of pulses in a first sensing sub-period and a second sensing sub-period in the period of one frame.

25 Claims, 23 Drawing Sheets

TOUCH DISPLAY DEVICE AND WEIGHTED TOUCH SENSING METHOD OF TOUCH CONTROLLER

CROSS-REFERENCE TO RELATED APPLICATION

This application claims the priority benefit of Republic of Korea Patent Application No. 10-2022-0057965, filed on May 11, 2022 in the Korean Intellectual Property Office, which is hereby incorporated by reference in its entirety.

BACKGROUND

Technical Field

The present disclosure relates to electronic devices with a display, and more specifically, to a touch display device and a weighted touch sensing method of a touch controller.

Description of the Related Art

As the information-oriented society has been developed, various needs for display devices for displaying images have increased. Recently, various types of display devices, such as liquid crystal display (LCD) devices, plasma display panel (PDP) devices, and organic light emitting diode (OLED) display devices, have been developed and widely used.

Among such display devices, touch display devices providing a touch-based input function are increasingly developed, and help users to input information or commands more intuitively and conveniently as compared with typical input devices, such as buttons, keyboards, mice, and the like.

In general, it is desired that such touch display devices provide an accurate touch sensing function and also produce a high level of image display function.

In addition, there is a need for methods capable of reducing power consumed by elements included in these touch display devices for providing a touch sensing function, as well as providing an accurate touch sensing function.

SUMMARY

To address these issues, one or more embodiments of the present disclosure may provide a touch display device and a weighted touch sensing method of a touch controller for providing an accurate touch sensing performance and a high quality of image display.

One or more embodiments of the present disclosure may provide a touch display device and a weighted touch sensing method of a touch controller for reducing power consumption.

According to aspects of the present disclosure, a touch display device can be provided that includes a display panel in which a plurality of subpixels are disposed and a plurality of touch electrodes overlapping one or more of the plurality of subpixels are disposed, and a touch driving circuit configured to supply a touch driving signal including a plurality of pulses to one or more of the plurality of touch electrodes, the touch driving circuit configured to output respective touch driving signals having different numbers of pulses in a first sensing sub-period and a second sensing sub-period in the period of one frame.

According to aspects of the present disclosure, a weighted touch sensing method of a touch controller can be provided that includes determining whether a valid touch is input in one sensing unit, controlling a touch driving circuit to supply a first touch driving signal having a smaller number of pulses to the one sensing unit when it is determined that the valid touch is not input in the one sensing unit, and controlling the touch driving circuit to supply a second touch driving signal having a larger number of pulses in the one sensing unit when it is determined that the valid touch is input in the one sensing unit.

According to one or embodiments of the present disclosure, a touch display device and a weighted touch sensing method of a touch controller may be provided for providing an accurate touch sensing performance and a high quality of image display.

According to one or embodiments of the present disclosure, a touch display device and a weighted touch sensing method of a touch controller may be provided for reducing power consumption.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain principles of the disclosure. In the drawings.

DETAILED DESCRIPTION

Figure 1:
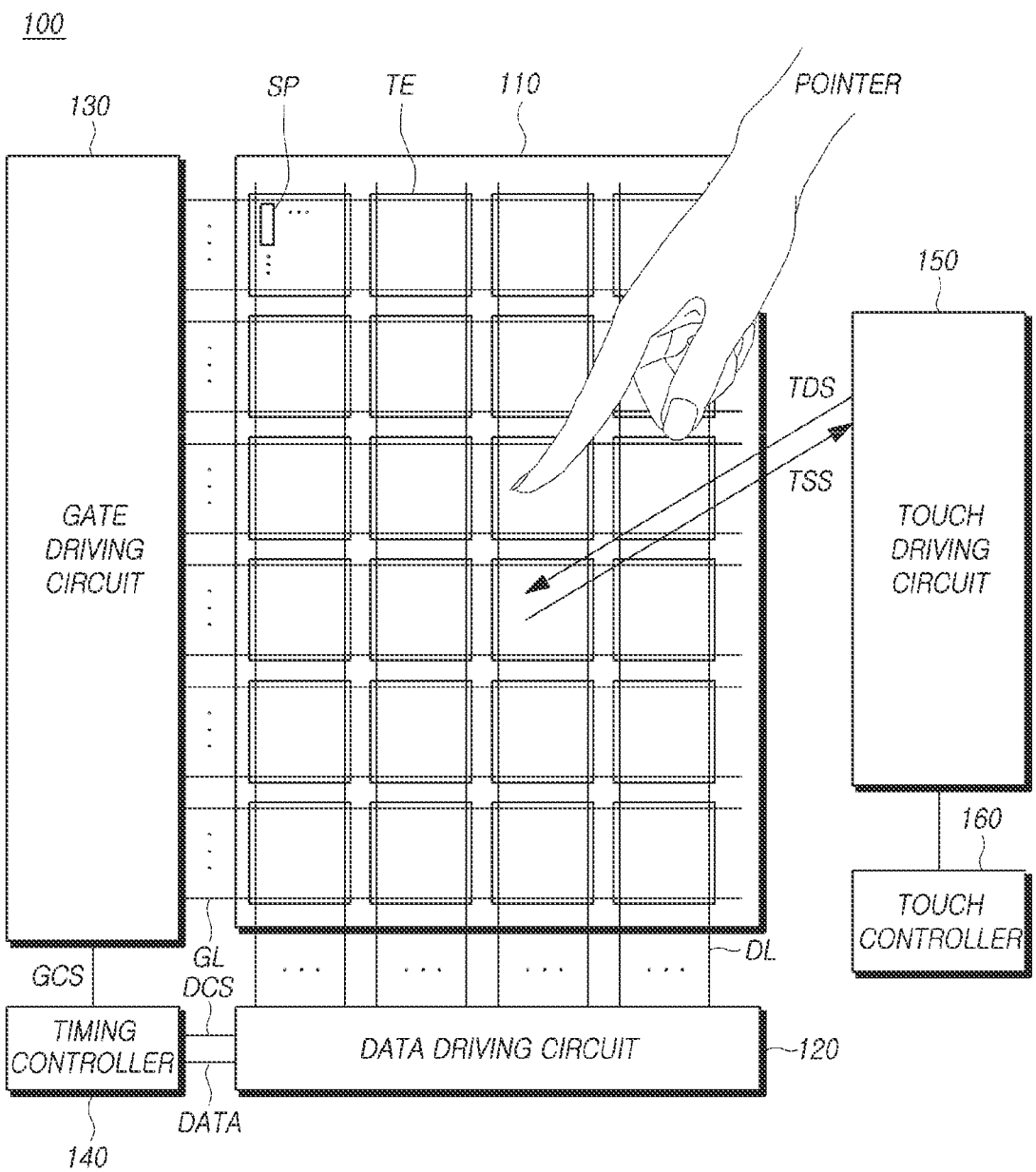
FIG. 1 illustrates an example system configuration of a touch display device according to embodiments of the present disclosure.

Reference will now be made in detail to embodiments of the present disclosure, examples of which may be illustrated in the accompanying drawings.

In the following description, the structures, embodiments, implementations, methods and operations described herein are not limited to the specific example or examples set forth herein and may be changed as is known in the art, unless otherwise specified. Like reference numerals designate like elements throughout, unless otherwise specified. Names of the respective elements used in the following explanations are selected only for convenience of writing the specification and may thus be different from those used in actual products. Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the protected scope of the present disclosure is defined by claims and their equivalents. In the following description, where the detailed description of the relevant known function or configuration may unnecessarily obscure aspects of the present disclosure, a detailed description of such known function or configuration may be omitted. The shapes, sizes, ratios, angles, numbers, and the like, which are illustrated in the drawings to describe various example embodiments of the present disclosure, are merely given by way of example. Therefore, the present disclosure is not limited to the illustrations in the drawings. Where the terms "comprise," "have," "include," "contain," "constitute," "make up of," "formed of," and the like are used, one or more other elements may be added unless the term, such as "only," is used. An element described in the singular form is intended to include a plurality of elements, and vice versa, unless the context clearly indicates otherwise.

Although the terms "first," "second," A, B, (a), (b), and the like may be used herein to describe various elements, these elements should not be interpreted to be limited by these terms as they are not used to define a particular order or precedence. These terms are used only to distinguish one element from another. For example, a first element could be termed a second element, and, similarly, a second element could be termed a first element, without departing from the scope of the present disclosure.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

Where positional relationships are described, for example, where the positional relationship between two parts is described using "on," "over," "under," "above," "below," "beside," "next," or the like, one or more other parts may be located between the two parts unless a more limiting term, such as "immediate(ly)," "direct(ly)," or "close(ly)" is used. For example, where an element or layer is disposed "on" another element or layer, a third element or layer may be interposed therebetween. Furthermore, the terms "left," "right," "top," "bottom," "downward," "upward," "upper," "lower," and the like refer to an arbitrary frame of reference.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, with reference to the accompanying drawings, various embodiments of the present disclosure will be described in detail.

FIG. 1 illustrates an example system configuration of a touch display device 100 according to embodiments of the present disclosure.

Referring to FIG. 1, in one or more embodiments, the touch display device 100 may include a display panel 110, various circuits, and the like.

The touch display device 100 according to embodiments of the present disclosure can perform a display function for displaying images and a touch function for sensing a touch by a pointer or object such as a finger, a pen, or the like.

In one or more embodiments, the touch display device 100 may include a touch screen panel TSP to perform the touch function.

For example, the touch screen panel TSP (shown in FIG. 2) may be located outside of the display panel 110. In this example, the touch screen panel TSP may be an add-on type, in which it is attached to the display panel 110.

In another example, the touch screen panel TSP may be located inside of the display panel 110 (which may be referred to as an integrated type). In this example, the touch screen panel TSP may be integrated into the display panel 110 in an in-cell type or an on-cell type, or the like.

Hereinafter, for convenience of description, discussions are provided based on examples where the touch screen panel TSP is integrated into the display panel 110, i.e., operating in the integrated type. Hereinafter, instead of using a separate touch screen panel TSP, the display panel 110 will be considered to include the function of the touch screen panel TSP. It should be therefore understood that the display panel 110 described below includes the meaning of the touch screen panel TSP.

In one or more embodiments, the touch display device 100 may perform the display function and the touch function at different time periods.

In other words, in the touch display device 100 according to embodiments of the present disclosure, a display period for performing the display function and a touch sensing period for performing the touch function may be divided in the time domain and separately allocated from each other. Herein, a driving scheme in which image displaying and touch sensing are respectively based on display periods and touch sensing periods divided in the time domain and separately allocated from each other may be referred to a time division driving.

That is, this implementation may mean that the touch display device 100 performs display driving for image displaying and touch sensing driving for touch sensing based on time division driving.

In one or more embodiments, a plurality of data lines DL for delivering data signals and a plurality of gate lines GL for delivering gate signals may be disposed in the display panel 110. Further, a plurality of subpixels SP that receive the data signals from the plurality of data lines DL and the gate signals from the plurality of gate lines GL may be disposed in the display panel 110. In the display panel 110, an area in which the plurality of subpixels SP are arranged and an image can be displayed may be defined as an active area. In the display panel 110, an area located outside of the display area and not allowing an image to be display may be defined as a non-active area.

In one or more embodiments, since the display panel 110 can perform the function of a touch screen panel TSP together, a plurality of touch electrodes TE serving as a touch sensor or touch sensors may be integrated into the display panel 110. The plurality of touch electrodes TE may be disposed to overlap the display area.

In this sense, the display panel 110 according to embodiments of the present disclosure may be a type of display panel integrating a touch screen panel TSP, and this type of display panel 110 may be also referred to as a "touch screen integrated display panel".

Referring to FIG. 1, in one or more embodiments, the touch display device 100 may include a data driving circuit 120 configured to output data signals to drive a plurality of data lines DL, and a gate driving circuit 130 configured to output gate signals to drive a plurality of gate lines GL.

In one or more embodiments, the touch display device 100 may further include a timing controller 140 for controlling operation timings of, and/or power supply to, the data driving circuit 120 and the gate driving circuit 130.

The timing controller 140 can supply a data driving circuit control signal DCS for controlling an operation timing of the data driving circuit 120, image data DATA, and the like to the data driving circuit 120. The timing controller 140 can supply a gate driving circuit control signal GCS for controlling an operation timing of the gate driving circuit 130, and the like to the gate driving circuit 130.

Referring to FIG. 1, in one or more embodiments, the touch display device 100 may include a touch driving circuit 150 configured to drive a plurality of touch electrodes TE to perform the touch function, and a touch controller 160 (which may be also referred to as a touch processor 160) configured to determine the presence or absence of a touch, a location of the touch, and/or the like based on a signal received from one or more driven electrodes TE among the plurality of touch electrodes TE.

The touch driving circuit 150 can supply a touch driving signal TDS to the plurality of touch electrodes TE for driving the plurality of touch electrodes TE.

Further, the touch driving circuit 150 can obtain a touch sensing signal TSS by sensing one or more touch electrodes TE among the plurality of touch electrodes TE disposed in the display panel 110.

For example, the touch driving circuit 150 can obtain a touch sensing signal TSS by sensing one or more touch electrodes TE of the display panel 110 to which a touch driving signal TDS is applied, or can obtain a touch sensing signal TSS by sensing one or more touch electrodes TE located around one or more touch electrodes TE to which a touch driving signal TDS is applied.

The touch driving circuit 150 can transmit the obtained touch sensing signal TSS or sensing data obtained through signal processing for the obtained touch sensing signal TSS to the touch controller 160.

The touch controller 160 can execute a touch algorithm (touch sensing process) using the touch sensing signal TSS or the sensing data, and determine the presence or absence a touch, a location of the touch, and/or the like based on a result of the execution of the touch algorithm.

In one or more embodiments, the touch display device 100 according to embodiments of the present disclosure may employ a self-capacitance based touch sensing technique in which the presence or absence of a touch and/or a location of the touch can be determined based on a variance in capacitance between each touch electrode TE to which a touch driving signal TDS is input and a pointer or object.

In this technique, a touch driving signal TDS can be applied to each touch electrode TE, and then, touch sensing signals TSS can be detected from each touch electrode TE to which the touch driving signal TDS is applied.

In one or more embodiments, the touch display device 100 may include a plurality of touch electrodes TE including one or more touch driving electrodes (which may be also referred to as TX electrodes) and one or more touch sensing electrodes (which may be also referred to as RX electrodes). In these embodiments, a touch driving signal TDS can be applied to one or more touch driving electrodes, and one or more touch sensing signals TSS can be received from one or more touch sensing electrodes.

In these embodiments, the touch display device 100 can detect the presence or absence of a touch and/or a location of the touch based on a variance in capacitance between one or more touch driving electrodes and one or more touch sensing electrodes. Such a touch sensing technique, in which the presence or absence of a touch and/or a location of the touch can be determined based on a variance in capacitance between one or more touch driving electrodes and one or more touch sensing electrodes, may be also referred to as a mutual-capacitance touch sensing technique. In one or more embodiments, the touch display device 100 according to aspects of the present disclosure may employ the mutual-capacitance touch sensing technique.

Hereinafter, for convenience of description, discussions will be provided by focusing on examples where the touch display device 100 employs the self-capacitance based touch sensing technique. However, it should be noted that the scope of the present disclosure includes examples where the touch display device 100 employs the mutual-capacitance touch sensing technique.

Meanwhile, the above-mentioned data driving circuit 120, gate driving circuit 130, timing controller 140, touch driving circuit 150, touch controller 160, and the like may be functionally defined elements. These elements may be implemented separately, or in one or more implementations, two or more elements thereof may be integrated and thus implemented in a respective single element.

One touch electrode TE may have a size that is larger than one subpixel SP. A size of one touch electrode TE may correspond to (e.g., match) or be larger than a size of an area occupied by a plurality of subpixels SP.

A ratio between a size of the touch electrode TE and a size of the subpixel may be variously configured comprehensively taking account of design considerations such as touch sensing efficiency and performance, influence of touch sensing on the display function, and/or the like.

In one or more embodiments, one touch electrode TE may be formed as one large electrode (also referred to as a bulk electrode).

In one or more embodiments, one touch electrode TE may be a plate electrode without an opening, or an electrode with one or more openings.

In one or more embodiments, one touch electrode TE may be formed such that a plurality of sub-electrodes arranged in a mesh pattern and electrically connected to each other forms one touch electrode TE.

In one or more embodiments, one touch electrode TE may be formed such that a plurality of sub-electrodes arranged in a line form and electrically connected to each other forms one touch electrode TE.

In these manner, the touch electrode TE may be designed in various forms and sizes. According to these embodiments, one touch electrode TE shown in FIG. 1 may be one touch driving unit area and/or one touch sensing unit area.

In one or more aspects, the touch display device 100 may be any one of various types of display devices such as a liquid crystal display device, a self-emission display device, and the like in terms of the display function.

For example, the touch display device 100 according to aspects of the present disclosure may be a liquid crystal display device. In examples where the touch display device 100 according to aspects of the present disclosure operates based on time division driving, a plurality of touch electrodes TE can perform different functions in a display period and a touch sensing period.

For example, the touch display device 100 according to aspects of the present disclosure may be a self-emission display device. In this example, the display panel 110 itself can emit light. Each of a plurality of subpixels SP may include a respective light emitting element.

In one or more embodiments, the display device 100 according to embodiments of the present disclosure may be an organic light emitting display device in which a light emitting element is implemented using an organic light emitting diode (OLED). In one or more embodiments, the display device 100 according to aspects of the present disclosure may be an inorganic light emitting display device in which a light emitting element is implemented using an inorganic material based light emitting diode. In one or more embodiments, the display device 100 according to aspects of the present disclosure may be a quantum dot display device in which a light emitting element includes quantum dots, which are self-emission semiconductor crystals.

For example, during a display period, a plurality of touch electrodes TE may function, as a common electrode, to which a voltage is commonly applied in terms of the display function. For example, during a touch period, the plurality of touch electrodes TE may function as electrodes for touch sensing.

The common electrode may be, for example, an electrode forming a capacitor with a pixel electrode to which a data voltage is applied in the liquid crystal display device.

In another example, the common electrode may be an electrode for supplying a base voltage to a light emitting element. This common electrode may be a cathode electrode (or anode electrode) of the light emitting element.

Figure 2:
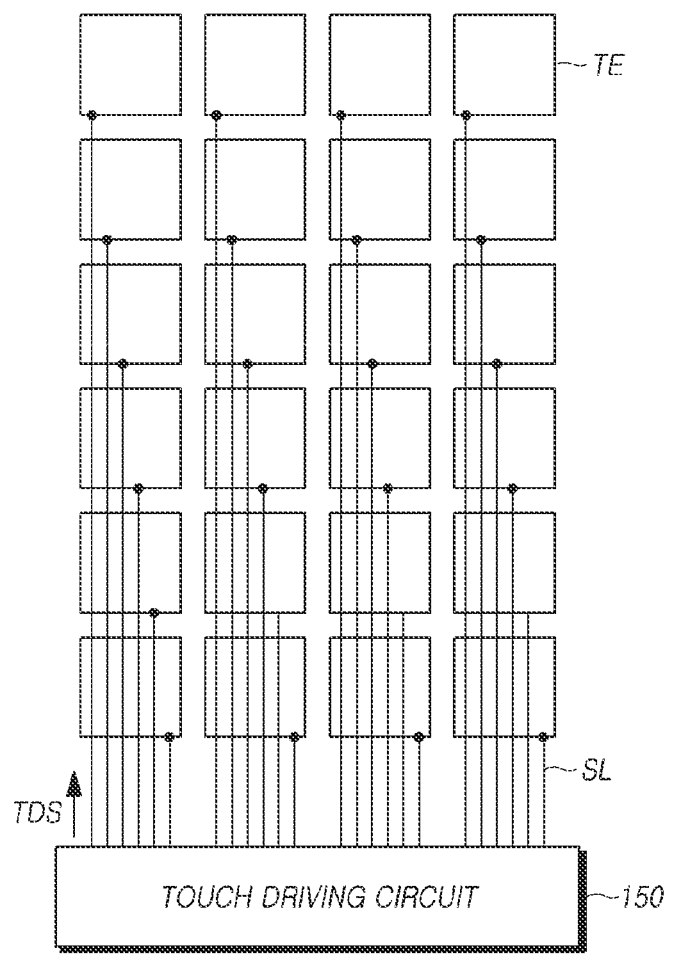
FIG. 2 illustrates an example touch screen panel integrated into a display panel and a touch driving circuit in the touch display device according to embodiments of the present disclosure.

FIG. 2 illustrates an example touch screen panel integrated into the display panel 110 and the touch driving circuit 150 in the touch display device 100 according to aspects of the present disclosure.

FIG. 2 illustrates a structure of a touch screen panel TSP using the self-capacitance based touch sensing technique.

Referring to FIG. 2, a plurality of touch electrodes TE and a plurality of signal lines SL may be disposed in the touch screen panel TSP. The plurality of signal lines SL can serve to electrically interconnect the plurality of touch electrodes TE and the touch driving circuit 150.

In the structure of sensing a touch using the self-capacitance based touch sensing technique, each of the plurality of touch electrodes TE may be located without being overlapped with each other. The plurality of touch electrodes TE and the plurality of signal lines SL may be disposed in a same layer or may be disposed in different layers.

In an example where the plurality of touch electrodes TE and the plurality of signal lines SL are located in a same layer, the plurality of signal lines SL may be disposed not to overlap the plurality of touch electrodes TE.

In an example where the plurality of touch electrodes TE and the plurality of signal lines SL are located in different layers, the plurality of signal lines SL may be disposed to overlap the plurality of touch electrodes TE.

Each of the plurality of signal lines SL may be located without being overlapped with each other, but embodiments of the present disclosure are not limited thereto.

The touch driving circuit 150 can supply a touch driving signal TDS to one or more of the plurality of touch electrodes TE during a touch sensing period.

One or more of the plurality of signal lines SL can deliver the touch driving signal TDS to one or more of the plurality of touch electrodes TE in the touch sensing period. One or more of the plurality of signal lines SL can transmit a common voltage to one or more of the plurality of touch electrodes TE in a display period.

Figure 3:
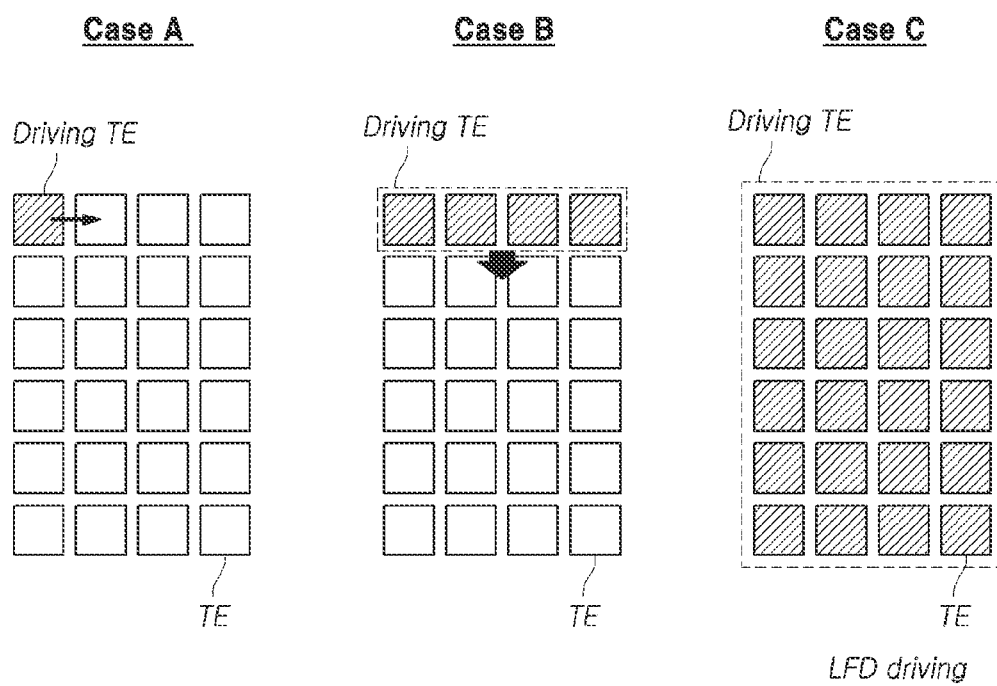
FIG. 3 illustrates example touch driving schemes of the touch display device according to embodiments of the present disclosure.

FIG. 3 illustrates example touch driving schemes of the touch display device 100 according to embodiments of the present disclosure.

Although FIG. 3 illustrates an example where 24 touch electrodes TE are arranged in 6 rows and 4 columns, however, embodiments of the present disclosure are not limited thereto.

Referring to FIG. 3, in one or more embodiments, the touch driving circuit 150 can drive only one touch electrode TE as shown in Case A, or drive a plurality of touch electrodes TE as shown in Case B, at any one time.

In case A, the display device may include a multiplexer (not shown) for selecting any one of 24 touch electrodes TE. The multiplexer may correspond to one analog front end AFE. The configuration of the multiplexer will be described in detail with reference to FIG. 4.

In Case B, the touch display device may organize two or more touch electrodes TE into one group as one sensing unit.

Referring to FIG. 3, for example, one sensing unit may be formed by four touch electrodes TE organized into one group among 24 touch electrodes TE. Two or more touch electrodes TE forming one sensing unit can be sensed together. According to a point of view, this situation may be described such that two or more touch electrodes TE forming one sensing unit are concurrently driven.

Different multiplexers may be electrically connected to two or more touch electrodes TE forming one sensing unit, respectively.

Referring to FIG. 3, since four touch electrodes TE forms one sensing unit, four multiplexers may be electrically connected to the four touch electrodes TE.

The four multiplexers may be electrically connected to the four touch electrodes TE forming one sensing unit, respectively. Each of the multiplexers may correspond to one analog front end.

The four multiplexers can concurrently output a respective touch driving signal TDS to the four touch electrodes TE forming one sensing unit, respectively.

In one or more embodiments, in order to reduce an influence of unnecessary parasitic capacitance formed between one or more touch electrodes TE to which a touch driving signal TDS is applied and nearby patterns (e.g., one or more data lines, one or more gate lines, one or more other touch electrodes, and one or more other conductive elements), the touch display device 100 can output a same signal as, or a signal similar to, the touch driving signal TDS to such nearby patterns.

The method of applying a same signal as, or a signal similar to, a touch driving signal TDS to nearby patterns may be also referred to as a load free driving LFD.

For example, the same signal as a touch driving signal TDS may be applied to one or more touch electrodes TE located around a touch electrode TE for sensing a touch through the load free driving.

Case C represents a method of sensing a touch by driving even one or more touch electrodes TE not to be used to sense the touch. This case may represent the example where a driving signal TDS is applied to one or more touch electrodes TE located around a touch electrode TE for sensing a touch.

In case C, a same signal as, or a signal similar to, a touch driving signal TDS may be input to one or more data lines and/or one or more gate lines.

Figure 4:
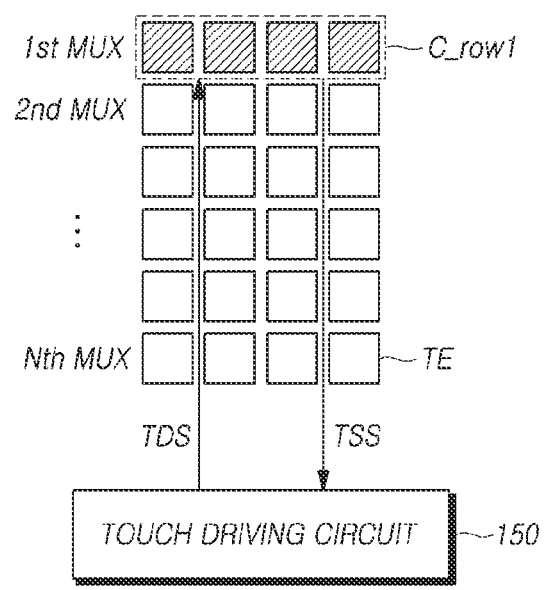
FIG. 4 illustrates an example touch sensing scheme when a multiplexer circuit is included in the touch display device according to embodiments of the present disclosure.

FIG. 4 illustrates an example touch sensing scheme when a multiplexer circuit is included in the touch display device 100 according to embodiments of the present disclosure.

Referring to FIG. 4, the touch driving circuit 150 can sense four touch electrodes TE as one sensing unit. In this implementation, the touch driving circuit 150 may include four multiplexers.

For example, the four touch electrodes TE included in one sensing unit may be arranged in a same row. For convenience of description, discussions that follow are provided based on an example where two or more touch electrodes TE included in one sensing unit are arranged in a same row, but embodiments of the present disclosure are not limited thereto.

The touch driving circuit 150 may organize a plurality of touch electrodes TE into several groups, and can sense each group as one sensing unit. The touch driving circuit 150 can obtain a touch sensing signal TSS by sensing touch electrodes TE included in one sensing unit in a touch sensing period.

Each group may be sensed sequentially or non-sequentially according to locations in the touch screen panel.

For example, four touch electrodes TE arranged in a first row can be sensed in a first sensing sub-period (1st MUX). Further, four touch electrodes TE arranged in an Nth row may be sensed in an Nth sensing sub-period, where n is greater than or equal to 1.

Meanwhile, an order in which each group is sensed may be variously changed according to design considerations. Discussions that follow are provided based on examples where each group is sequentially sensed according to a respective location in the touch screen panel TSP, but embodiments of the present disclosure are not limited thereto.

Touch electrodes TE, serving as sensing electrodes, to which a touch driving signal TDS is applied function as capacitors. Accordingly, the touch driving circuit 150 can receive touch sensing signals TSS from the touch electrodes TE to which the touch driving signal TDS is applied.

For example, the four touch electrodes TE arranged in the first row may be concurrently sensed in the first sensing sub-period (1st MUX) by the touch driving circuit 150. The touch driving circuit 150 can sense the four touch electrodes TE arranged in the first row, which function as a first row capacitor C_row1, and thereby, obtain a touch sensing signal TSS from the four touch electrodes TE arranged in the first row.

For example, the four touch electrodes TE arranged in the Nth row may be concurrently sensed in the Nth (N≥1) sensing sub-period (Nth MUX). The touch driving circuit 150 can sense the four touch electrodes TE arranged in the Nth row, which function as an Nth row capacitor C_rowN, and thereby, obtain a touch sensing signal TSS from the four touch electrodes TE arranged in the Nth row.

In this manner, the touch display device can concurrently sense two or more touch electrodes TE.

Figure 5:
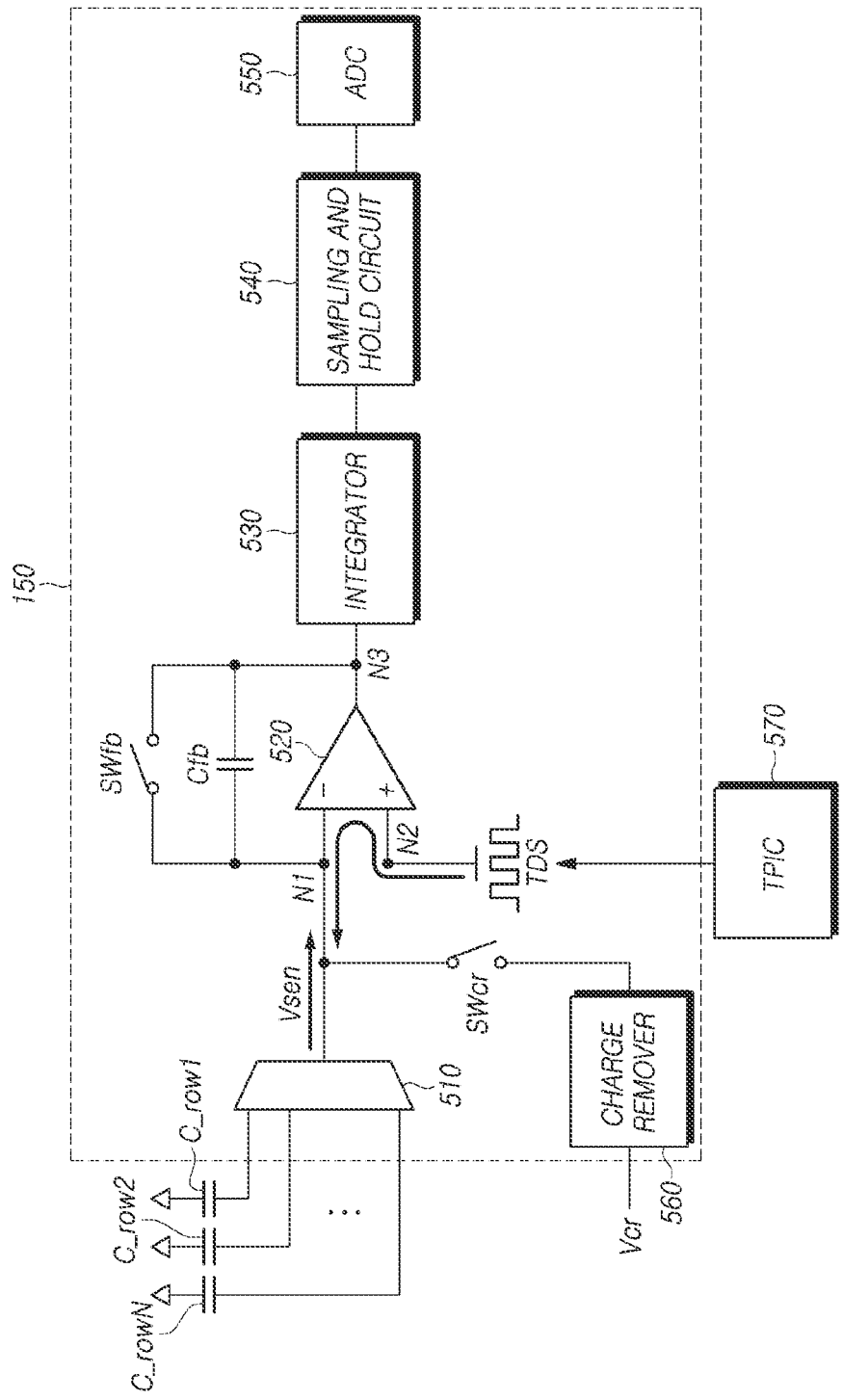
FIG. 5 illustrates an example configuration of the touch driving circuit included in the touch display device according to embodiments of the present disclosure.

FIG. 5 illustrates an example configuration of the touch driving circuit 150 included in the touch display device 100 according to embodiments of the present disclosure.

Referring to FIG. 5, in one or more embodiments, the touch display device 100 according to embodiments of the present disclosure may include a multiplexer circuit 510, an operational amplifier 520, an integrator 530, a sampling and hold circuit 540, an analog-to-digital converter (ADC) 550, a charge remover 560, and the like.

The multiplexer circuit 510 may include, for example, the four multiplexers described above with reference to FIGS. 3 and 4.

The multiplexer circuit 510 can sense touch electrodes, and output one or more obtained touch sensing signals. Row capacitors (C_row1 to C_rowN), which are expressed as being electrically connected to input terminals of the multiplexer circuit 510, may be implemented with physical capacitor elements or may be implemented with the touch electrodes TE described above.

The multiplexer circuit 510 can output each of touch sensing signals respectively obtained from the first to Nth row capacitors (C_row1 to C_rowN) as a respective sensing signal Vsen.

The respective sensing signal Vsen may correspond to a touch sensing signal obtained through each row capacitor.

The operational amplifier 520 may include a first input terminal N1, a second input terminal N2, and an output terminal N3.

A sensing signal Vsen can be input to the first input terminal N1 of the operational amplifier 520. A reference signal can be input to the second input terminal N2 of the operational amplifier 520. For example, this reference signal may be a touch driving signal TDS discussed above. A signal corresponding to an amount of variances in capacitance between a touch input object (e.g., a finger, a pen, or the like) and a touch electrode TE can be output via the output terminal N3 of the operational amplifier 520.

The first input terminal N1 and the second input terminal N2 of the operational amplifier 520 may be an inverting input terminal (−) and a non-inverting input terminal (+), respectively.

Referring to FIG. 5, the touch driving circuit 150 may include a feedback capacitor Cfb electrically connected to the first input terminal N1 and the output terminal N3 of the operational amplifier 520.

The feedback capacitor Cfb may include one end electrically connected to the first input terminal N1 of the operational amplifier 520 and the other end electrically connected to the output terminal N3 of the operational amplifier 520.

The feedback capacitor Cfb can be charged with a value corresponding to a voltage difference between a sensing signal Vsen input to the first input terminal N1 and a touch driving signal TDS.

Referring to FIG. 5, in one or more embodiments, the touch driving circuit 150 may include a feedback switch SWfb for switching an electrical connection between the first input terminal N1 and the output terminal N3 of the operational amplifier 520. Charging and discharging of the feedback capacitor Cfb can be controlled depending on an operation of the feedback switch SWfb.

In one or more embodiments, a touch driving signal TDS input to the second input terminal N2 of the operational amplifier 520 may be input to each row capacitor through the multiplexer circuit 510. Accordingly, the touch driving signal TDS may be input to two or more touch electrodes forming one sensing unit.

Thereby, the two or more touch electrodes can be concurrently sensed. In one or more embodiments, a signal for load reduction (e.g., a same signal as, or a signal similar to, the touch driving signal TDS) may be applied, as a load free driving signal, to one or more patterns located around the touch electrodes to be sensed.

In one or more embodiments, the load free driving signal for load reduction may be a separate signal distinct from the touch driving signal TDS. In these embodiments, a separate signal distinct from the touch driving signal TDS may be input to the second input terminal N2 of the operational amplifier 520.

A signal output from the output terminal N3 of the operational amplifier 520 may be input to the integrator 530.

The integrator 530 can integrate voltage values output from the output terminal N3 of the operational amplifier 520 by a predefined number of times or over a predefined time, and output a resulting integral value.

The number of times the integrator 530 integrates voltage values output from the output terminal N3 of the operational amplifier 520 may depend on the number of pulses of the touch driving signal TDS.

The sampling and hold circuit 540 can sample and store the integral value output from the integrator 530.

The analog-to-digital converter 550 can read the integral value stored in the sampling and hold circuit 540, convert the read integral value into a corresponding digital value, and output the converted digital value. The output digital value can be input to the touch controller (see FIG. 1).

Referring to FIG. 5, since a sensing signal Vsen output from the multiplexer circuit 510 is input to the first input terminal N1 of the operational amplifier 520, a voltage at the first input terminal N1 of the operational amplifier 520 can become saturated.

The charge remover 560 can be configured to remove electric charges remaining in the first input terminal N1 of the operational amplifier 520.

An electrical connection between the charge remover 560 and the first input terminal N1 of the operational amplifier 520 can be controlled by a charge remover switching element SWcr.

A pulse voltage Vcr for removing electric charges may be input to the charge remover 560.

Meanwhile, the touch driving signal TDS input to the second input terminal N2 of the operational amplifier 520 may be generated and output by a touch power circuit 570 (which may be referred to as a touch power integrated circuit TPIC).

In this manner, the touch driving circuit 150 according to aspects of the present disclosure can apply one or more touch driving signals TDS to one or more touch electrodes. Thereby, the touch driving circuit 150 can sense a touch based on a variance in capacitance between the one or more touch electrodes and a touch input object in response to the applied touch driving signal TDS.

Figure 6:
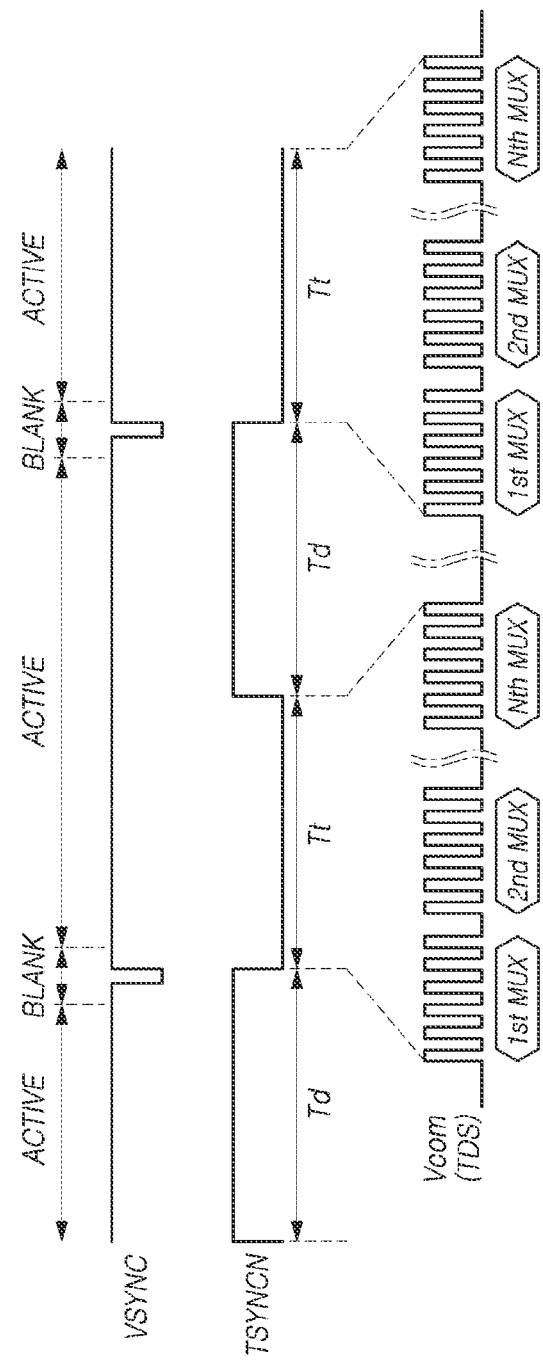
FIG. 6 illustrates example touch sensing periods and display periods separately allocated in the time domain when the touch display device senses a touch based on time division driving according to embodiments of the present disclosure.

FIG. 6 illustrates example touch sensing periods and display periods separately allocated in the time domain when the touch display device 100 senses a touch based on time division driving according to embodiments of the present disclosure.

Referring to FIG. 6, in the touch display device, one frame period may be defined based on a vertical synchronization signal VSYNC.

One frame may be divided into an active period ACTIVE and a blank period BLANK based on the vertical synchronization signal VSYNC. An image can be displayed in the display panel in at least a portion of the active period ACTIVE, In one or more embodiments, when the touch display device performs touch sensing based on time division driving, one frame may be divided into one or more touch sensing periods Tt and one or more display periods Td.

Although FIG. 6 illustrates that one touch sensing period Tt and one display period Td are included in one frame period, embodiments of the present disclosure are not limited thereto. For example, two or more touch sensing periods Tt and/or two or more display periods Td may be included in one frame period.

For convenience of description, discussions that follow are provided based on examples where one touch sensing period Tt and one display period Td are allocated in one frame; however, embodiments of the present disclosure are not limited thereto.

Referring to FIG. 6, the display period Td and the touch sensing period Tt may be divided based on the touch synchronization signal TSYNC.

During one or more display periods Td, as described above, a plurality of touch electrodes can function as a common electrode to which a common voltage is applied, and during one or more touch sensing periods Tt, the plurality of touch electrodes can function as electrodes for sensing a touch in response to an applied touch driving signal TDS.

Referring to FIG. 6, one touch sensing period Tt may include a first sensing sub-period (1st MUX) to an Nth sensing sub-period (Nth MUX).

Each of the first sensing sub-period (1st MUX) to the Nth sensing sub-period (Nth MUX) may be a period for sensing a respective touch electrode different from each other.

A touch driving signal TDS including two or more pulses may be applied to each of the first sensing sub-period (1st MUX) to the Nth sensing sub-period (Nth MUX). According to this implementation, a period in which a touch driving signal TDS is applied may correspond to the length of a touch sensing period Tt.

Meanwhile, in one frame, when one touch sensing period Tt having a smaller (e.g., shorter) length is used, one display period Td having a larger (e.g., longer) length can be used. According to this implementation, an effect of increasing the quality of an image to be displayed or implementing a higher scanning rate can be provided.

That is, it is desired to provide a method capable of further reducing the length of a touch sensing period Tt in one frame while maintaining sensing accuracy for a touch input at an appropriate level or higher.

Figure 7:
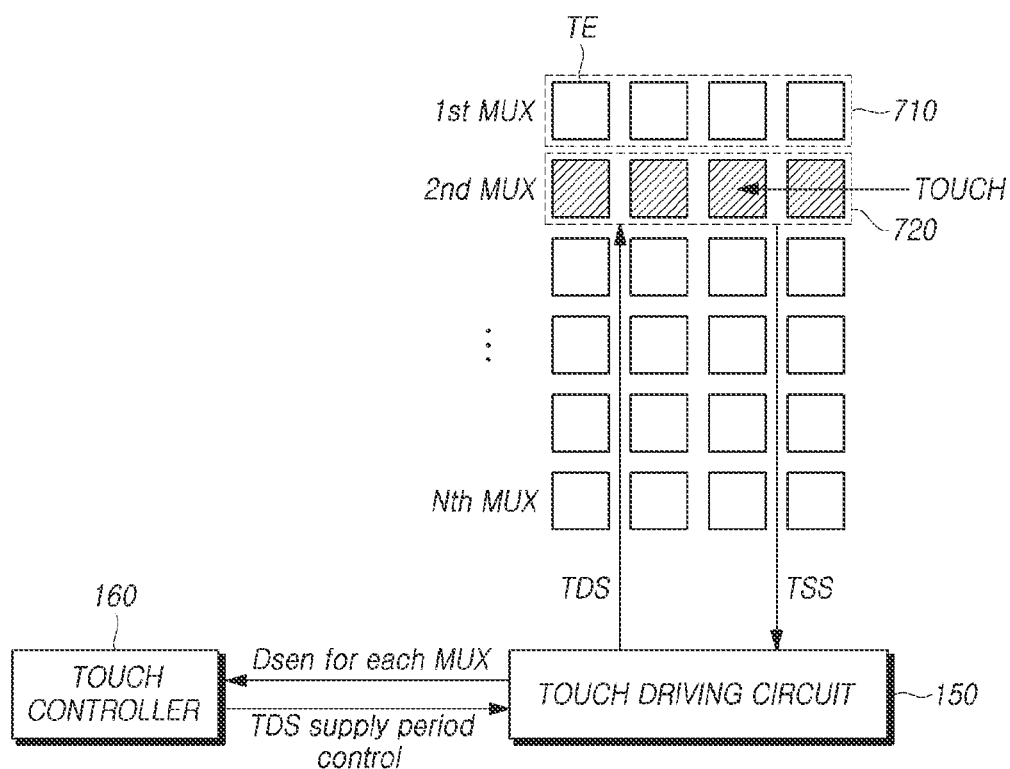
FIG. 7 schematically illustrates an example method for allocating a longer display period in the touch display device according to embodiments of the present disclosure.

FIG. 7 schematically illustrates an example method for allocating a longer display period in the touch display device 100 according to embodiments of the present disclosure.

Referring to FIG. 7, in one or more embodiments, operation of the touch display device can be performed such that a touch driving signal TDS is supplied for a relatively longer period in a sensing sub-period (e.g., a second sensing sub-period (2nd MUX) in which it is determined that a touch has been input.

For example, the touch driving circuit 150 can sense touch electrodes TE of a first sensing unit 710 in a first sensing sub-period (1st MUX), and sense touch electrodes TE of a second sensing unit 720 in a second sensing sub-period (2nd MUX).

The touch driving circuit 150 can convert a value resulting from sensing the plurality of touch electrodes TE for each sensing sub-period into a corresponding digital value, and output the converted digital value to the touch controller 160.

The touch controller 160 can determine that a touch has been input through the touch electrode TE included in the second sensing unit 720 when a sensing value for the second sensing unit 720 exceeds a preset threshold.

Based on the determination, the touch controller 160 can control the touch driving circuit 160 to provide a touch driving signal TDS for a relatively longer time to the second sensing unit 720 through which the touch has been input.

For example, the touch controller 160 can control a touch driving signal TDS supplied to the second sensing unit 720 through which a touch has been input to have a greater number of pulses than a touch driving signal TDS supplied to a sensing unit (e.g., the first sensing unit 710) through which a touch has not been input, i.e., in the manner of increasing the number of pulses.

For example, the touch controller 160 can control a touch driving signal TDS supplied to a sensing unit (e.g., the first sensing unit 710) through which a touch has not been input to have a smaller number of pulses than a touch driving signal TDS supplied to the second sensing unit 710 through which a touch has been input, i.e., in the manner of decreasing the number of pulses.

In one or more embodiments, the touch controller 160 can set two or more threshold values, and control the number of pulses of a touch driving signal TDS (i.e., a period in which the touch driving signal TDS is applied) supplied to each sensing unit at three or more levels according to digital values input from the touch driving circuit 150.

For example, a touch driving signal including a largest number (e.g., amount) of pulses may be applied to a sensing unit through which it is determined that a touch has been input, and a touch driving signal including a smaller number (e.g., amount) of pulses may be applied to one or more sensing units located around the sensing unit through which it is determined that the touch has been input. In one or more embodiments, a touch driving signal including a much smaller number of pulses may be applied to a sensing unit through which it is determined that a touch has not been input.

As described above, the touch display device according to embodiments of the present disclosure can reduce the length of a touch sensing period applied to one or more touch electrodes while maintaining the accuracy of touch sensing at a level similar to other touch display devices.

For convenience of description, discussions that follow are provided based on examples where the presence or absence of a touch is determined based on one threshold, and the number of pulses of a touch driving signal TDS input to a touch sensing unit (e.g., the second sensing unit 720) through which it is determined that a touch has been input is increased, but embodiments of the present disclosure are not limited thereto.

In addition, for convenience of description, discussions that follow are provided based on examples where the touch display device according to embodiments of the present disclosure performs this implementation based on a situation in which a touch is input through only one touch sensing unit (which may be also referred to as a single touch), but embodiments of the present disclosure are not limited thereto. For example, discussions provided below with regard to the single touch may be also applied to two or more touch sensing units (which may be also referred to as a multi-touch).

Figure 8:
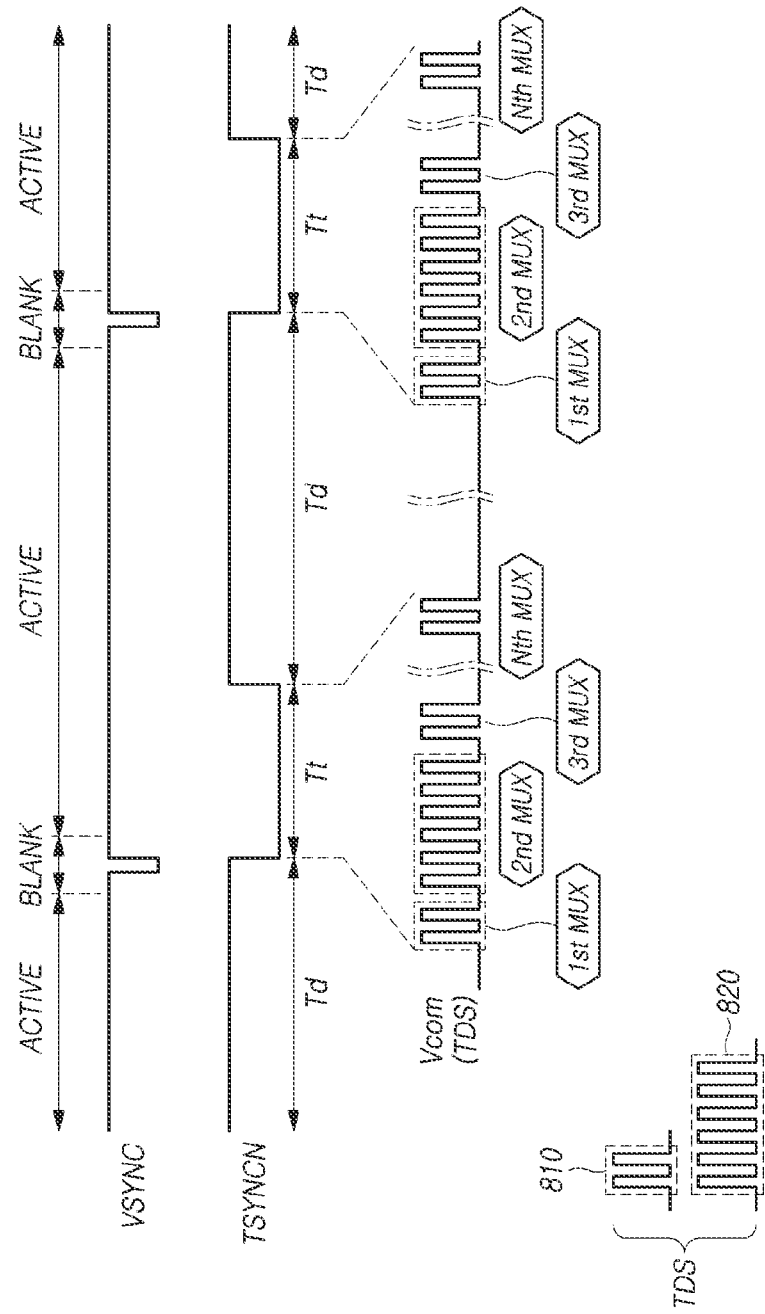
FIG. 8 illustrates an example where a period, in which touch sensing is performed, differs depending on a location in the display panel in the touch display device according to embodiments of the present disclosure.

FIG. 8 illustrates an example where a period in which touch sensing is performed can differ depending on a location in the display panel 110 in the touch display device 100 according to embodiments of the present disclosure.

Referring to FIG. 8, in one or more embodiments, the touch display device 100 according to embodiments of the present disclosure can apply a first touch driving signal 810 including a relatively small number of pulses to a first sensing sub-period (1st MUX), a third sensing sub-period (3rd MUX), an Nth sensing sub-period (Nth MUX), and the like in which it is determined that a touch has not been input.

In addition, the touch display device 100 can apply a second touch driving signal 820 including a relatively large number of pulses to a second sensing sub-period (2nd MUX) in which it is determined that a touch has been input. For example, a frequency of the second touch driving signal 820 may be the same as that of the first touch driving signal 810. In another example, a frequency of the second touch driving signal 820 may be designed to be different from a frequency of the first touch driving signal 810. Discussions that follow are provided based on examples where frequencies of the first touch driving signal 810 and the second touch driving signal 820 are the same, but embodiments of the present disclosure are not limited thereto.

According to these examples, touch sensing for a sensing sub-period (e.g., the first sensing sub-period (1st MUX), in which it is determined that a touch has not been input, may be performed for a relatively short time, and touch sensing for a sensing sub-period (e.g., the sensing sub-period (2nd MUX), in which it is determined that a touch has been input, may be performed for a relatively long time.

Accordingly, a simple determination such as the presence or absence of a touch, and/or the like can be performed in the sensing sub-period in which it is determined that a touch has not been input, and a detailed determination such as a touch location, and/or the like can be performed in a sensing sub-period in which it is determined that a touch has been input. Accordingly, the accuracy of touch sensing can be increased.

In one or more instances, when an area where it is determined that a touch has been input changes over time, a sensing sub-period in which a touch driving signal with a larger number of pulses is applied may change.

For example, FIG. 8 shows a situation where a touch is continuously input to the second sensing sub-period (2nd MUX).

Unlike this situation, a touch input in the second sensing period (2nd MUX) may be ended, and then, another new touch may be input in the first sensing sub-period (1st MUX). In this situation, a touch driving signal including a smaller number of pulses may be applied to the second sensing sub-period (2nd MUX), and a touch driving signal including a larger number of pulses may be applied to the first sensing sub-period (1st MUX).

Referring to the discussion provided above, an intensity of a touch sending signal TSS (refer to the example of FIG. 7) can be used to determine whether a touch has been input or not.

That is, a situation where a magnitude or intensity of a touch sensing signal TSS changes may indicate that a new touch has been input or that a present touch input has been ended. As described above, a second touch driving signal 820 including a larger number of pulses may be newly input to a touch electrode through which it is determined that the new touch has been input.

In addition, a first touch driving signal 810 including a smaller number of pulses may be newly input to a touch electrode through which it is determined that the present inputted touch has been ended.

Discussions that follow are provided based on examples where one or more touches are continuously input in the second sensing sub-period (2nd MUX). However, embodiments of the present disclosure are not limited thereto. For example, discussions provided below with regard to these examples may be also applied to examples where another touch (i.e., a new touch) is input, a current inputted touch is ended, or the like.

Figure 9:
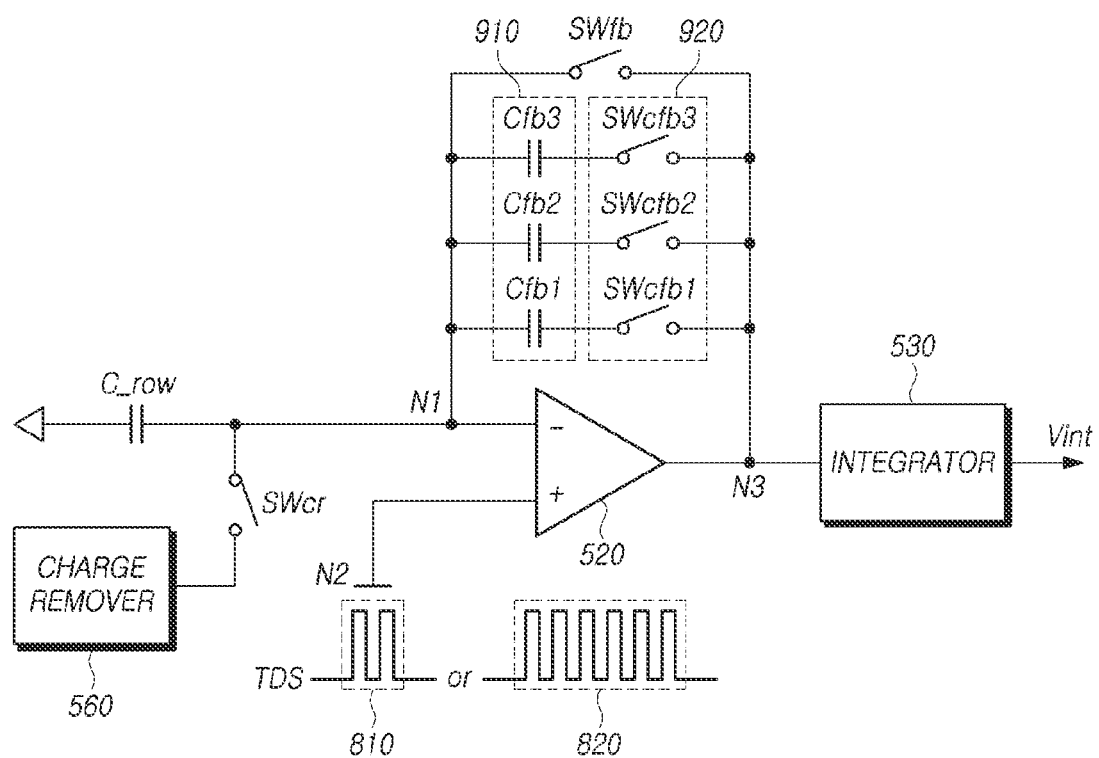
FIG. 9 illustrates an example where pulses of a touch driving signal input to an operational amplifier vary in the touch display device according to embodiments of the present disclosure.

FIG. 9 illustrates an example where pulses of a touch driving signal TDS input to the operational amplifier 520 vary in the touch display device 100 according to embodiments of the present disclosure.

Referring to FIG. 9, in one or more embodiments, in the touch display device 100 according to embodiments of the present disclosure, the number of pulses of a touch driving signal TDS input to the second input terminal N2 of the operational amplifier 520 may vary according to a status in a row capacitor C_row electrically connected to the first input terminal N1 of the operational amplifier 520.

For example, when it is determined that a touch has not been input across a row capacitor C_row, a first touch driving signal 810 including a smaller number of pulses may be correspondingly input to the second input terminal N2 of the operational amplifier 520, Further, when it is determined that a touch has been input across a row capacitor C_row, a second touch driving signal 820 having a larger number of pulses may be correspondingly input to the second input terminal N2 of the operational amplifier 520.

Meanwhile, an amount of electric charges charged in the feedback capacitor Cfb between the first input terminal N1 and the output terminal N3 of the operational amplifier 520 (see FIG. 5) can vary according to the number of pulses of a touch driving signal TDS input to the second input terminal N2 of the operational amplifier 520.

When the first touch driving signal 810 is input to the second input terminal N2 of the operational amplifier 520, an amount of electric charges charged in the feedback capacitor Cfb may be relatively small. In contrast, when the second touch driving signal 820 is input to the second input terminal N2 of the operational amplifier 520, an amount of electric charges charged in the feedback capacitor Cfb may be relatively large.

In one or more embodiments, in configuring the feedback capacitor, the touch display device 100 may include a feedback capacitor array 910 in which two or more feedback capacitors are connected in parallel.

Thus, the feedback capacitor array 910 may include two or more feedback capacitors connected in parallel. For example, the feedback capacitor array 910 may include a first feedback capacitor Cfb1, a second feedback capacitor Cfb2, and the like.

The capacities of the first feedback capacitor Cfb1 and the second feedback capacitor Cfb2 may be the same or different.

For example, respective one ends of two or more feedback capacitors (e.g., the first feedback capacitor Cfb1, the second feedback capacitor Cfb2, and the like) included in the feedback capacitor array 910 may remain electrically connected to each other.

Respective the other ends of two or more feedback capacitors (e.g., the first feedback capacitor Cfb1, the second feedback capacitor Cfb2, and the like) included in the feedback capacitor array 910 may be electrically connected to a first switching element array 920.

Referring to FIG. 9, for example, the first switching element array 920 may be located between the feedback capacitor array 910 and the output terminal N3 of the operational amplifier. In another example, the first switching element array 920 may be located between the feedback capacitor array 910 and the first input terminals N1 of the operational amplifier.

Discussions that follow are provided based on examples where the first switching element array 920 is electrically connected to the feedback capacitor array 910 and the output terminal N3 of the operational amplifier 520. However, embodiments of the present disclosure are not limited thereto.

The first switching element array 920 may include one or more switching elements (e.g., SWcfb1, SWcfb2, and/or SWcfb3).

Each of the one or more switching elements (SWcfb1, SWcfb2, and/or SWcfb3) included in the first switching element array 920 may include respective one end electrically connected to each of one or more feedback capacitors (Cfb1, Cfb2, and/or Cfb3) included in the feedback capacitor array 910.

Referring to FIG. 9, a first switching element SWcfb1 may include one end electrically connected to the other end of the first feedback capacitor Cfb1. In addition, a second switching element SWcfb2 may include one end electrically connected to the other end of the second feedback capacitor Cfb2. In one or more embodiments, charging and discharging of the first feedback capacitor Cfb1 and the second feedback capacitor Cfb2 may be controlled independent of each other.

In one or more embodiments, the number of feedback capacitors included in the feedback capacitor array 910 and the number of switching elements included in the first switching element array 920 may be the same.

In one or more embodiments, unlike shown in FIG. 9, the other ends of the first feedback capacitor Cfb1 and the second feedback capacitor Cfb2 may be electrically connected to one end of one switching element (e.g., the first switching element SWcfb1). In these embodiments, as the first switching element SWcfb1 is turned on and off, charging and discharging of the first feedback capacitor Cfb1 and the second feedback capacitor Cfb2 may be controlled together.

In one or more embodiments, the number of feedback capacitors included in the feedback capacitor array 910 and the number of switching elements included in the first switching element array 920 may be different from each other.

For convenience of description, discussions that follow are provided based on examples where each feedback capacitor is electrically connected to a respective switching element. However, embodiments of the present disclosure are not limited thereto.

Accordingly, control of switching elements can be performed such that the number of switching elements to be turned on in the first switching element array 920 differs according to the number of pulses of a touch driving signal TDS input to the second input terminal N2 of the operational amplifier 520.

According to this implementation, the number of feedback capacitors that can be charged and discharged in a situation where the first touch driving signal 810 is input to the second input terminal N2 of the operational amplifier 520 may be different from the number of feedback capacitors that can be charged and discharged in a situation where the second touch driving signal 820 is input to the second input terminal N2 of the operational amplifier 520.

In addition, as the feedback capacitor array 910 is configured, a range of capacitance may be configured in various embodiments. In one or more embodiments, even when a third touch driving signal having a different number of pulses from the first touch driving signal 810 and the second touch driving signal 820 is applied, a capacitance corresponding to this may be obtained in real time and utilized.

In one or more embodiments, in the touch display device according to embodiments of the present disclosure, the number of times of integration in the integrator 530 may differ according to the number of pulses of a touch driving signal TDS input to the second input terminal N2 of the operational amplifier 520.

Since an integral voltage Vint output from the integrator 530 (e.g., a circuit) is obtained by integrating electric charges charged in the feedback capacitor relative to a ground level, there may occur a situation where the ground level fluctuates as the number of times of integration increases. For example, the integrator 530 is a circuit that integrates an input with respect to time, and may include one or more operational amplifiers, one or more capacitors, and one or more resistors.

For example, in a situation where the second touch driving signal 820 is input to the second input terminal N2 of the operational amplifier 520, a corresponding ground level may be increased by an increased number of times of integration, compared to a situation where the first touch driving signal 810 is input to the second input terminal N2 of the operational amplifier 520.

The charge remover 560 (e.g., a circuit shown in FIG. 10) can operate to mitigate the extent to which a ground level of an integral voltage Vint is affected by the number of times of integration. An operation of the charge remover 560 for maintaining a ground level of an integral voltage Vint at a constant level will be described in more detail with reference to FIGS. 10 and 11.

In one or more embodiments, in the touch display device according to embodiments of the present disclosure, the number of times of integration of a touch driving signal TDS may be configured differently between one or more row capacitors through which it is determined that a touch has been input and one or more row capacitors through which it is determined that a touch has not been input.

Figure 10:
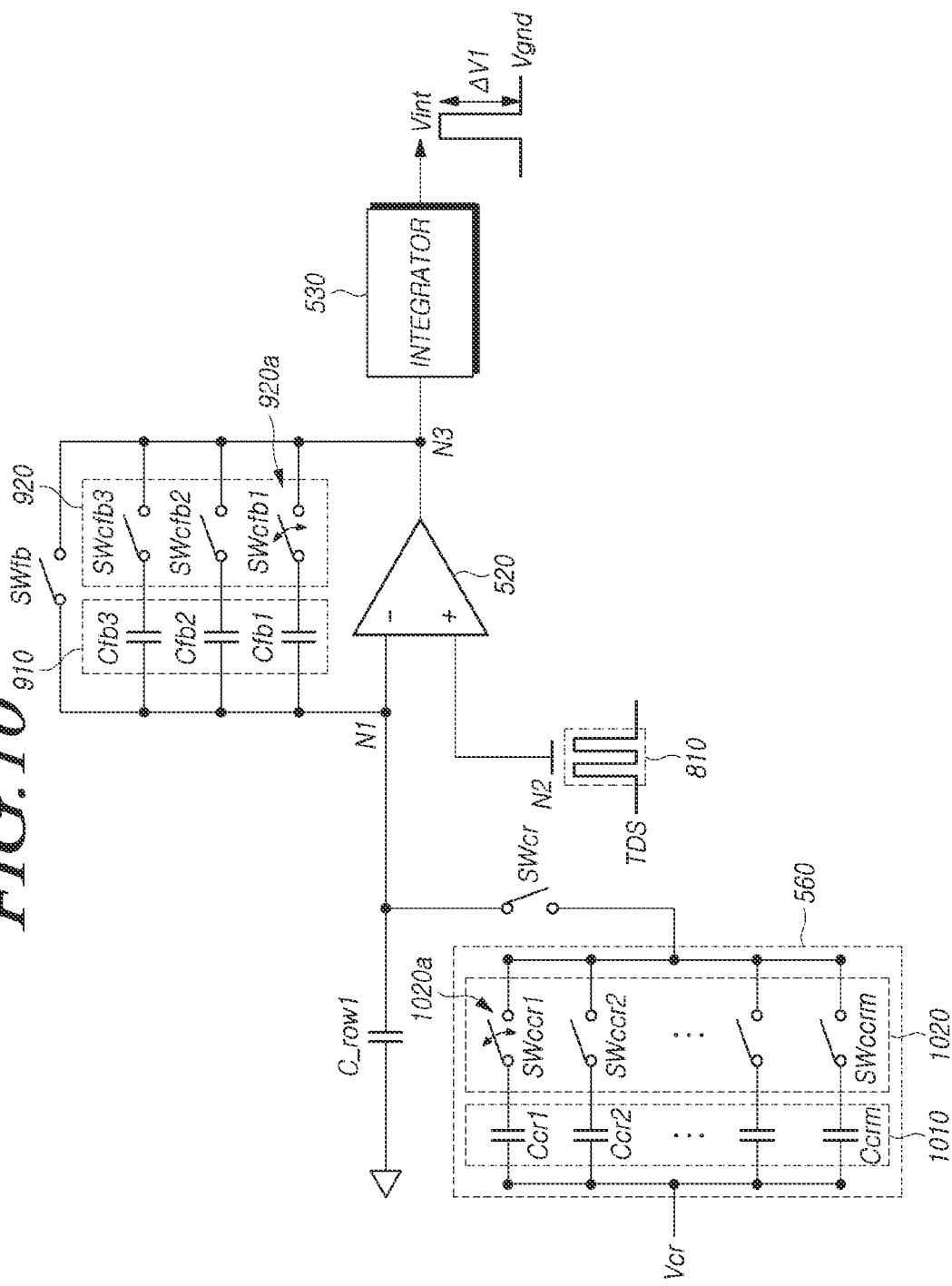
FIG. 10 illustrates example operations of a charge remover and a first switching element array when a first touch driving signal is input to an operational amplifier in the touch display device according to embodiments of the present disclosure.

FIG. 10 illustrates example operations of the charge remover 560 and the first switching element array 920 when a first touch driving signal 810 is input to the operational amplifier 520 in the touch display device 100 according to embodiments of the present disclosure.

Referring to FIG. 10, in the touch display device according to embodiments of the present disclosure, when the first touch driving signal 810 is input to the second input terminal N2 of the operational amplifier 520, an amount of electric charges charged in the feedback capacitor array 910 can be relatively small.

Referring to FIG. 10, the feedback capacitor array 910 may include a first feedback capacitor Cfb1, a second feedback capacitor Cfb2, and a third feedback capacitor Cfb3. For example, the first feedback capacitor Cfb1 may be charged, and the second and third feedback capacitors Cfb2 and Cfb3 may not be charged.

In this example, a first switching element SWcfb1 can be turned on, and a second switching element SWcfb2 and a third switching element SWcfb3 can remain turned off.

Meanwhile, as the first touch driving signal 810 with a relatively small number of pulses is input to the second input terminal N2 of the operational amplifier 520, the number of times the integrator 530 integrates can also be small.

Accordingly, a ground level Vgnd of an integral voltage Vint output from the integrator can be adjusted to reach a target level even when the charge remover 560 removes a relatively small amount of electric charges.

Referring to FIG. 10, the charge remover 560 may include a charge removal capacitor array 1010 including two or more charge removal capacitors (Ccr1, Ccr2, . . . , Ccrm). In one or more embodiments, the charge remover 560 may include a second switching element array 1020 for controlling charging and discharging of the charge removal capacitors Ccr.

The charge remover 560 may be electrically connected to one end of the charge remover switching element SWcr and a node to which a pulse voltage Vcr for charge removing is input.

An electrical connection between the first input terminal N1 of the operational amplifier 520 and the charge remover 560 can be switched by an operation of the charge remover switching element SWcr. Accordingly, a voltage level of the first input terminal N1 of the operational amplifier 520 can be lowered.

When the charge remover switching element SWcr is turned on, the first input terminal N1 of the operational amplifier 520 and the charge remover 560 can be electrically connected, and one or more charge removal capacitors (e.g., a first charge removal capacitor Ccr1) can be charged by an operation of the second switching element array 1020.

The charge removal capacitor Ccr, which has been charged, can be discharged by the pulse voltage Vcr for charge removing.

Through the process described above, a voltage of the first input terminal N1 of the operational amplifier 520 can be maintained at a constant level.

Referring to FIG. 10, when the first touch driving signal 810 is input, at least one switching element 920a included in the first switching element array 920 may be turned on, and at least one switching element 1020a included in the second switching element array 1020 may be turned on.

In this situation, when the first touch driving signal 810 is input, the number of switching elements 920a turned on among switching elements 920a included in the first switching element array 920 may be less than the total number of the switching elements 920a included in the first switching element array 920. That is, when the first touch driving signal 810 is input, one or more switching elements 920a among the switching elements 920a included in the first switching element array 920 may remain turned off.

For example, referring to FIG. 10, only the first switching element SWcfb1 among the three switching elements (SWcfb1, SWcfb2, and SWcfb3) included in the first switching element array 920 may be turned on.

In addition, when the first touch driving signal 810 is input, the number of switching elements 1020a turned on among switching elements 1020a included in the second switching element array 1020 may be less than the total number of switching elements 1020a included in the second switching element array 1020. That is, when the first touch driving signal 810 is input, one or more switching elements 1020a among the switching elements 1020a included in the second switching element array 1020 may remain turned off.

For example, referring to FIG. 10, a first switching element SWccr1 among m switching elements (SWccr1, SWccr2, . . . , SWccrm) included in the second switching element array 1020 may be turned on, where m is greater than or equal to 2.

Accordingly, when the first touch driving signal 810 is input, the integrator 530 can output a signal increased by a first voltage level ΔV1 from a ground level Vgnd as an integration voltage Vint.

Figure 11:
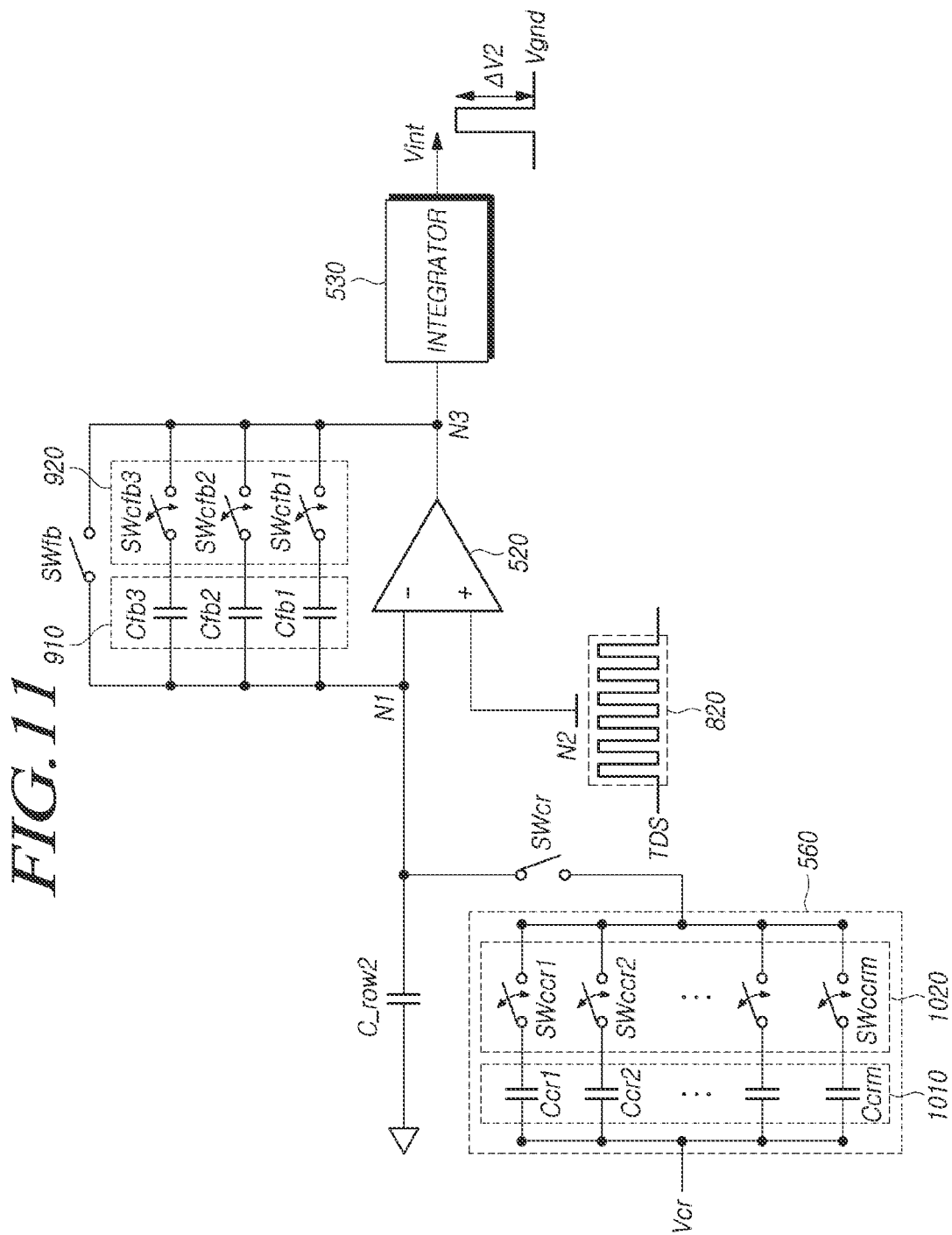
FIG. 11 illustrates example operations of the charge remover and the first switching element array when a second touch driving signal is input to the operational amplifier in the touch display device according to embodiments of the present disclosure.

FIG. 11 illustrates example operations of the charge remover 520 and the first switching element array 920 when a second touch driving signal 820 is input to the operational amplifier 520 in the touch display device 100 according to aspects of the present disclosure.

In describing the configuration of FIG. 11, description of elements and/or operations that are the same as those of FIG. 10 is omitted to avoid redundancy.

Referring to FIG. 11, when the second touch driving signal 820 is input to the second input terminal N2 of the operational amplifier 520, a relatively large amount of electric charges can be charged in the feedback capacitor array 910.

The first switching element array 920 can be switched so that a more amount of electric charges can be charged in the feedback capacitor array 910.

For example, when respective capacities of the first to third feedback capacitors (Cfb1, Cfb2, and Cfb3) included in the feedback capacitor array 910 are the same, relatively greater switching elements can be turned on.

For example, when respective capacities of the first to third feedback capacitors (Cfb1, Cfb2, and Cfb3) included in the feedback capacitor array 910 are different from each other, a switching element electrically connected to a relatively larger feedback capacitor can be turned on.

Referring to FIG. 11, when the second touch driving signal 820 is input to the second input terminal N2 of the operational amplifier 520, the charge remover 560 can remove a relatively large amount of electric charges.

The second switching element array 1020 can be switched so that a greater amount of electric charges can be charged in the charge removal capacitor array 1010.

For example, when respective capacities of the first charge removal capacitor Ccr1 to the mth charge removal capacitor Ccrm included in the charge removal capacitor array 1010 are the same, relatively greater switching elements can be turned on.

For example, when respective capacities of the first charge removal capacitor Ccr1 to the mth charge removal capacitor Ccrm included in the charge removal capacitor array 1010 are different from each other, a switching element electrically connected to a relatively larger charge removal capacitor can be turned on.

Accordingly, when the second touch driving signal 820 is input, the integrator 530 can output a signal increased by a second voltage level ΔV2 from a ground level Vgnd as an integration voltage Vint.

For example, the second voltage level ΔV2 may be greater than the first voltage level ΔV1.

Figure 12:
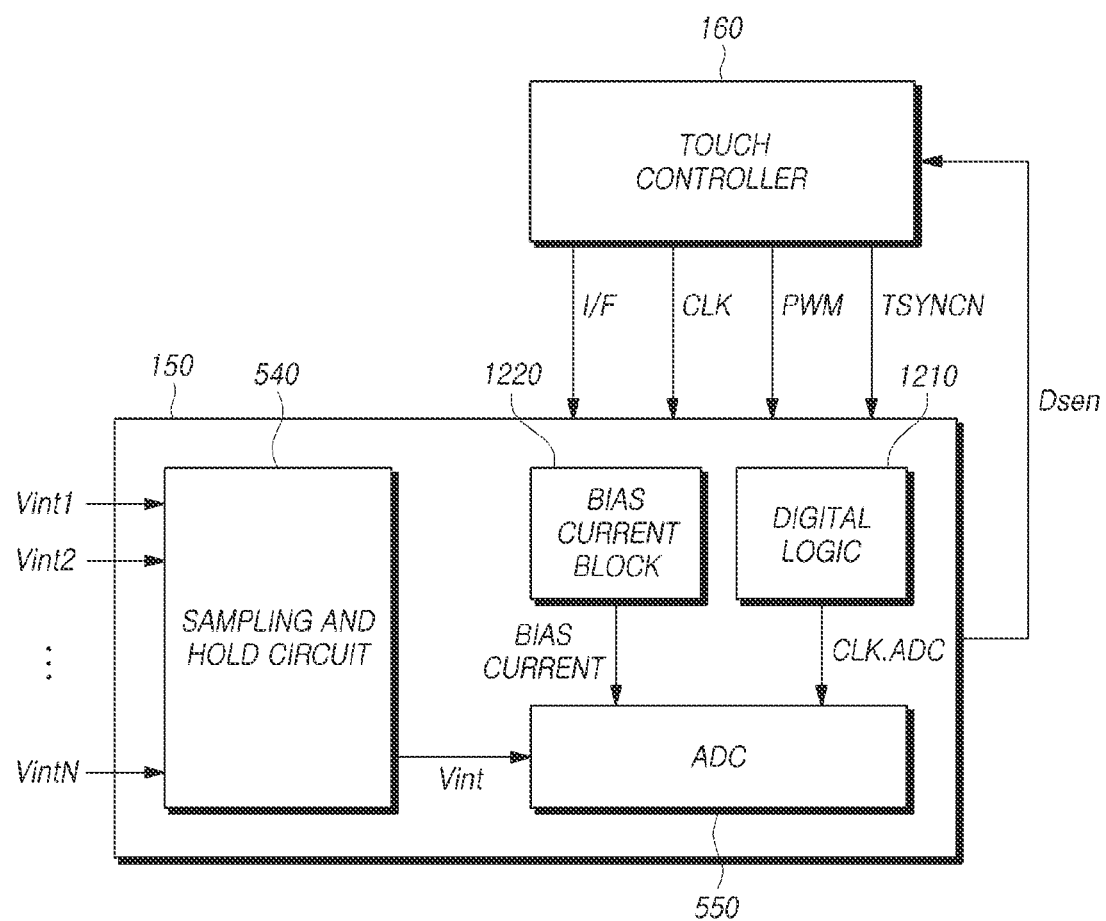
FIG. 12 illustrates an example system block diagram of a touch driving circuit including an analog-to-digital converter and a touch controller controlling the touch driving circuit in the touch display device according to embodiments of the present disclosure.

FIG. 12 illustrates an example system block diagram of a touch driving circuit 150 including an analog-to-digital converter 550 and a touch controller 160 controlling the touch driving circuit 150 in the touch display device 100 according to aspects of the present disclosure.

Referring to FIG. 12, the analog-to-digital converter 550 can sense a sampling and hold circuit 540, convert a sensed integral voltage Vint into a corresponding digital value Dsen, and output the converted digital value to the touch controller 160.

The analog-to-digital converter 550 can receive a bias current BIAS CURRENT and an analog-to-digital converting clock CLK.ADC to convert an analog voltage into a digital value.

The bias current BIAS CURRENT may represent a current for driving the analog-to-digital converter 550.

The bias current BIAS CURRENT and the analog-to-digital conversion clock CLK.ADC are directly related to resolution of the analog-to-digital converter 550. When the bias current BIAS CURRENT has a large value, the resolution of the analog-to-digital converter 550 can increase. When the bias current BIAS CURRENT has a small value, the resolution of the analog-to-digital converter 550 can decrease.

When a high frequency of analog-to-digital conversion clock CLK.ADC is input to the analog-to-digital converter 550, a sampling period of the analog-to-digital converter 550 can be shorter, resulting in higher resolution. When a low frequency of analog-to-digital conversion clock CLK.ADC is input to the analog-to-digital converter 550, a sampling period of the analog-to-digital converter 550 can be longer, resulting in lower resolution.

It is noted that power consumption of the touch driving circuit 150 can increase as the bias current BIAS CURRENT has a larger value. Further, when a high frequency of analog-to-digital converting clock CLK.ADC is generated and output, power consumption of the touch driving circuit 150 can increase.

The bias current BIAS CURRENT can be input to the analog-to-digital converter 550 from a bias current generation block 1220 (e.g., a circuit). The touch controller 160 can control the bias current generation block 1220 to adjust a level or amount of the bias current BIAS CURRENT input to the analog-to-digital converter 550. For example, the bias current generation block 1220 may be a bias current generation circuit including a current supplier supplying a bias current.

The analog-to-digital converting clock CLK.ADC can be generated and output from a digital logic 1210 and input to the analog-to-digital converter 550. The touch controller 160 can control the digital logic 1210 to adjust a frequency of the analog-to-digital converting clock CLK.ADC input to the analog-to-digital converter 550. For example, the digital logic 1210 may be a digital logic circuit, and may receive the clock signal CLK in the form of a digital signal composed of 0 and 1 and output the analog-to-digital converting clock CLK.ADC having a frequency controlled according to the frequency of the input clock signal CLK. For example, the digital logic 1210 may include various logic circuit elements capable of adjusting the frequency of a digital signal. For example, logic circuit elements may include flip-flops or latches and the like.

As described above, when an integral voltage Vint input to the analog-to-digital converter 550 has a high voltage level, the integral voltage Vint can represent a value obtained by sensing a touch electrode through which a touch has been input.

In one or more embodiments, the touch display device can control the analog-to-digital converter 550 to be configured with a higher resolution when a voltage level of a voltage input to the analog-to-digital converter 550 is high.

That is, in order to more accurately sense an area where it is determined that a touch has been input, the analog-to-digital converter 550 can be controlled to have a higher resolution at a timing when an integral voltage (Vint) for this area is input to the analog-to-digital converter 550.

To perform this implementation, a higher level of bias current BIAS CURRENT can be applied to the analog-to-digital converter 550. Further, a high frequency of analog-to-digital converting clock CLK.ADC can be input to the analog-to-digital converter 550.

A line through which a clock signal CLK is transmitted, a line through which a pulse width modulation signal PWM is transmitted, a line through which a touch synchronization signal TSYNCN is transmitted, and/or the like may be provided between the touch controller 160 and the touch driving circuit 150.

An interface line I/F may be provided between the touch controller 160 and the touch driving circuit 150. In one or more embodiments, the interface line I/F may be a bi-directional transmission and reception enabled line.

The touch controller 160 can receive a digital value Dsen output from the touch driving circuit 150 through the interface line I/F. The touch controller 160 can output a signal for controlling a length of a touch driving signal (e.g., the first touch driving signal or the second touch driving signal discussed above) to the touch driving circuit 150 through the interface line I/F.

In this manner, the analog-to-digital converter 550 can perform sampling an integral signal Vint at different resolutions, convert data resulting from the sampling into a digital value Dsen, and output the converted digital value Dsen to the touch controller 160.

Figure 13:
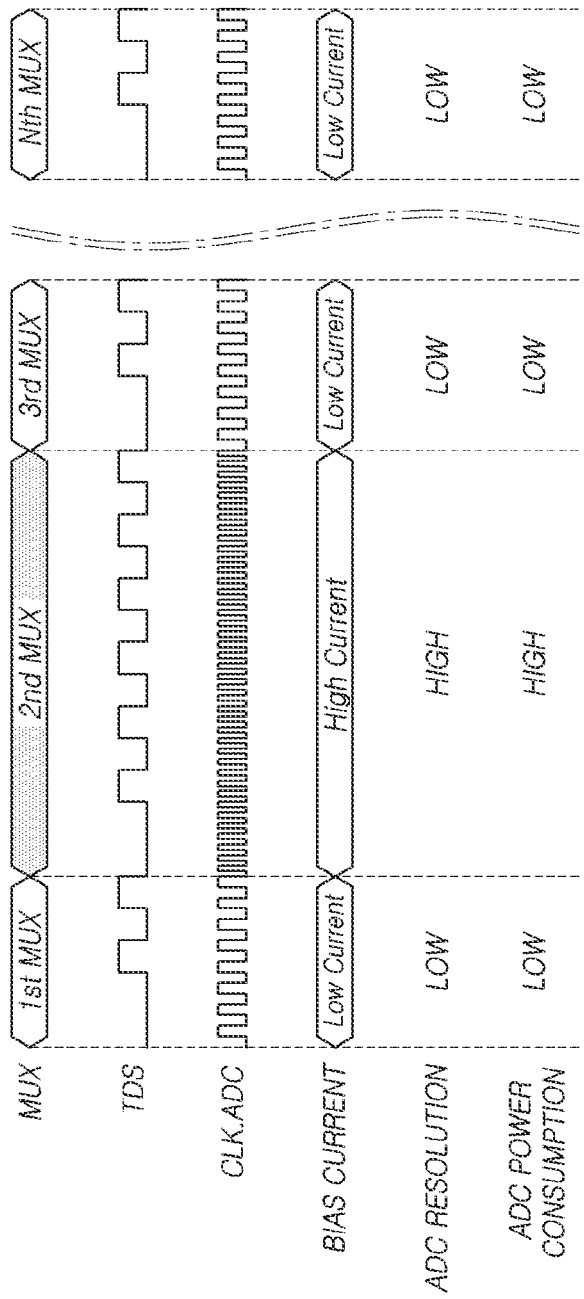
FIG. 13 illustrates an example method for efficiently sensing a touch input while reducing power consumption in the analog-to-digital converter in the touch display device according to embodiments of the present disclosure.

FIG. 13 illustrates an example method for efficiently sensing a touch input while reducing power consumption in the analog-to-digital converter in the touch display device 100 according to embodiments of the present disclosure.

Referring to FIG. 13, in one or more embodiments, in the touch display device 100 according to aspects of the present disclosure can apply touch driving signals TDS having different lengths according to sensing sub-periods.

For example, a touch driving signal TDS having a smaller number of pulses can be applied in a first sensing sub-period (1st MUX), and a touch driving signal TDS having a larger number of pulses can be applied in a second sensing sub-period (2nd MUX).

The reason the touch driving signal TDS having the smaller number of pulses is applied may be because it is determined that a touch has not been input in a corresponding area.

Since a change in capacitance in the corresponding area is generally not large, the analog-to-digital converter can sense the corresponding area with a relatively low resolution.

Accordingly, when sensing such a corresponding area, a level of the bias current BIAS CURRENT input to the analog-to-digital converter can be low. Further, a frequency of the analog-to-digital converting clock CLK.ADC input to the analog-to-digital converter can be low.

In contrast, the reason the touch driving signal TDS having the larger number of pulses is applied may be because it is determined that a touch has been input in a corresponding area.

Since a change in capacitance in the corresponding area may be large, the analog-to-digital converter can sense the corresponding area with a relatively high resolution.

Accordingly, when sensing such a corresponding area, a level of the bias current BIAS CURRENT input to the analog-to-digital converter can be high. Further, a frequency of the analog-to-digital converting clock CLK.ADC input to the analog-to-digital converter can be high.

In this manner, the resolution of the analog-to-digital converter can be adjusted. Further, power consumption consumed in the process of analog-to-digital converting can be reduced.

Figure 14:
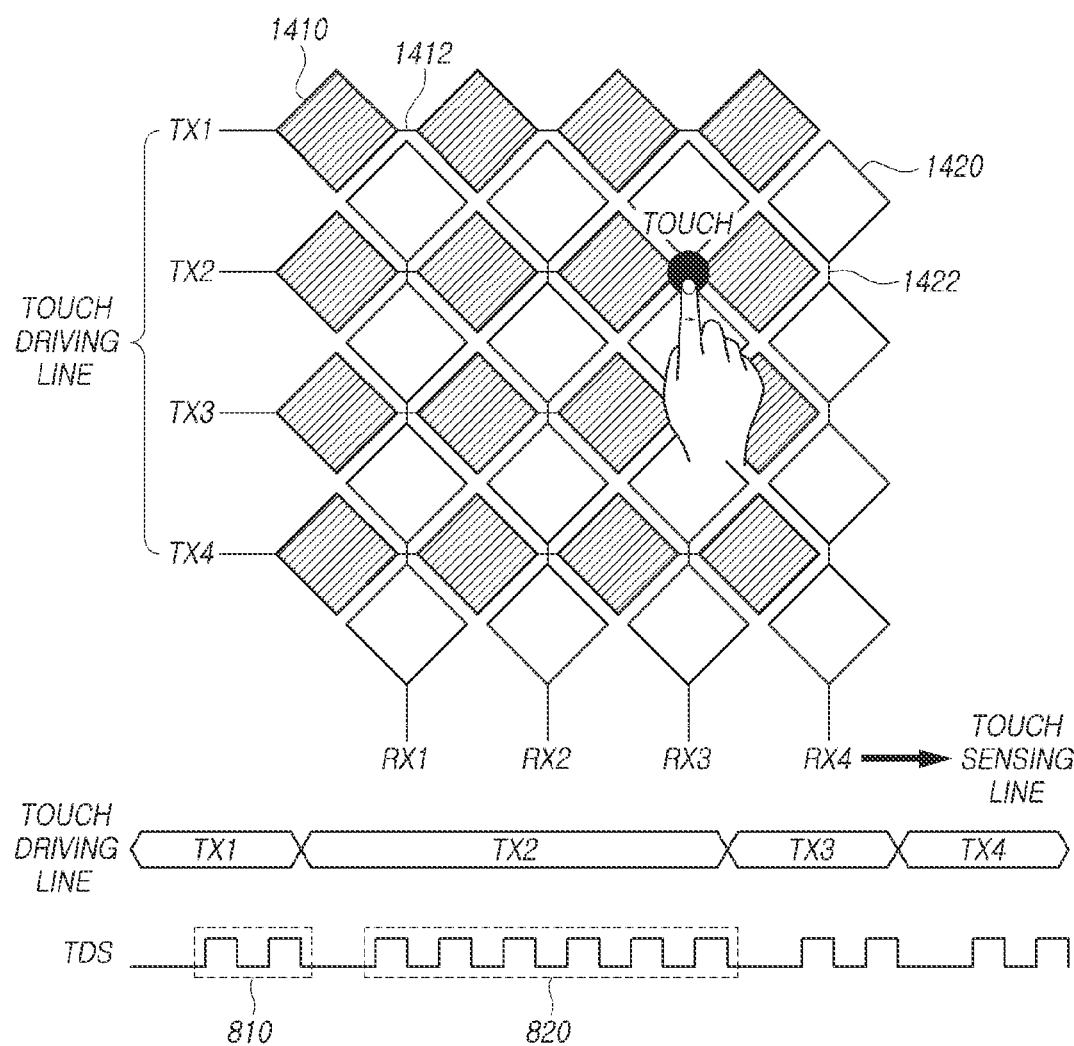
FIG. 14 schematically illustrates an example method for allocating a longer display period in a case where the touch display device according to embodiments of the present disclosure is configured to sense a touch input in a mutual-capacitance scheme.

FIG. 14 schematically illustrates an example method for allocating a longer display period in a case where the touch display device 100 is configured to sense a touch input in the mutual-capacitance scheme according to embodiments of the present disclosure.

In one or more embodiments, the touch display device 100 can sense a touch input using the mutual-capacitance touch sensing technique.

A plurality of touch electrodes may include one or more touch driving lines to which a touch driving signal TDS is applied, and one or more touch sensing lines for delivering a touch sensing signal. Each touch driving line and each touch sensing line may function as both ends of a respective capacitor.

When a pointer or object (e.g., a finger of a user, a pen, or the like) approaches the plurality of touch electrodes, an amount of electric charges charged between the touch driving line and the touch sensing line can decrease. Based on this, a touch input can be sensed.

Each touch driving line may include one or more touch driving electrodes 1410 and one or more first connection electrodes 1412.

For example, one touch driving line may include two or more touch driving electrodes 1410. The two or more touch driving electrodes 1410 may be arranged in a first direction. The touch driving electrodes 1410 arranged in the first direction may be electrically connected to each other through one or more first connection electrodes 1412.

Each touch sensing line may include one or more touch sensing electrodes 1420 and one or more second connection electrodes 1422.

For example, one touch sensing line may include two or more touch sensing electrodes 1420. The two or more touch sensing electrodes 1420 may be arranged in a second direction different from the first direction. The touch sensing electrodes 1420 arranged in the second direction may be electrically connected to each other through one or more second connection electrodes 1422.

For example, the one or more first connection electrodes 1412 and the one or more second connection electrodes 1422 may be located in different layers. In this example, the one or more first connection electrodes 1412 and the one or more second connection electrodes 1422 may overlap each other.

In another example, the one or more first connection electrodes 1412 and the one or more second connection electrodes 1422 may be located in a same layer. In this example, the one or more first connection electrodes 1412 and the one or more second connection electrodes 1422 may be located without overlapping each other.

Although FIG. 14 illustrates that four touch driving lines TX1 to TX4 and four touch sensing lines RX1 to RX4 are disposed, however, embodiments of the present disclosure are not limited thereto.

Referring to FIG. 14, in one or more embodiments, the touch display device 100 can apply a touch driving signal TDS to each touch driving line. Further, a change in capacitance can be sensed by sensing each touch sensing line.

For example, when a touch driving signal TDS is input to each touch driving line TX, a touch driving circuit (e.g., the touch driving circuit 150 in figures discussed above) can obtain a touch sensing signal by sensing the first to fourth touch sensing lines RX1 to RX4.

Referring to FIG. 14, there may occur a case in which it is determined that a touch has not been input through the first touch driving line TX1 and a touch has been input through the second touch driving line TX2.

The touch driving circuit can supply a first touch driving signal 810 with a smaller number of pulses to the first touch driving line TX1, and a second touch driving signal 820 with a larger number of pulses to the second touch driving line TX2.

In summary of the foregoing discussions, the touch display device 100 according to aspects of the present disclosure can minimize or reduce a period in which a touch driving signal is applied even when performing touch sensing based on the mutual-capacitance scheme.

Further, the touch display device 100 can reduce power consumption in an analog-to-digital converting process even when performing touch sensing based on the mutual-capacitance scheme. Even when image displaying and touch sensing are not based on touch sensing periods and display periods separately allocated in the time domain (for example, in the case of concurrent driving where one or more touch sensing periods and one or more display periods overlap each other), the touch display device 100 according to aspects of the present disclosure can provide an effect of reducing power consumption in the analog-to-digital converting process.

Figure 15:
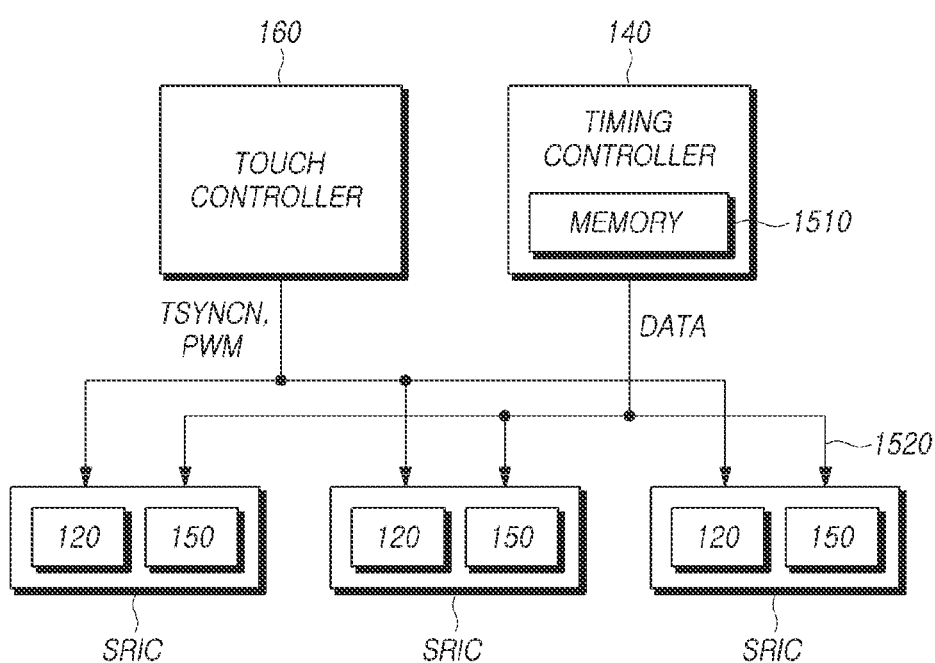
FIG. 15 illustrates an example where the data driving circuit and the touch driving circuit are incorporated in each other and disposed in one incorporated integrated circuit in the touch display device according to embodiments of the present disclosure.

FIG. 15 illustrates an example where the data driving circuit 120 and the touch driving circuit 150 are incorporated in each other and disposed in one incorporated integrated circuit SRIC in the touch display device 100 according to aspects of the present disclosure.

In one or more embodiments, the touch display device 100 according to aspects of the present disclosure may include an incorporated integrated circuit SRIC (e.g., a source data IC+a read-out IC) in which both the data driving circuit 120 and the touch driving circuit 150 are disposed.

In one or more embodiments, the touch display device 100 may include two or more incorporated integrated circuits SRIC. The timing controller 140 and the touch controller 160 may be connected to two or more incorporated integrated circuits SRIC.

In one or more embodiments, an interface such as low voltage differential signaling (LVDS), serial peripheral interface (SPI), or the like may be provided between the timing controller 140 and the data driving circuit 120. These interfaces may include lines 1520 through which image data DATA is transmitted.

In one or more embodiments, the incorporated integrated circuit SRIC may include terminals for receiving various control signals including a touch synchronization signal TSYNCN, and the like from the touch controller 160.

In examples where the touch display device according to the embodiments of the present disclosure operates based on the time division driving, one or more touch sensing periods and one or more display periods may be separately allocated in the time domain from each other. At least a part of one touch sensing period may overlap an active period based on the vertical synchronization signal (refer to the discussions of the configuration of FIG. 6).

In one or more embodiments, the touch display device 100 according to aspects of the present disclosure may include a memory 1510 for tentatively storing image data DATA in a touch sensing period.

Image data DATA during a touch sensing period overlapped with an active period among one frame period can be tentatively stored in the memory 1510.

When the touch sensing period ends, the data driving circuit 120 can read values stored in the memory 1510 and generate data voltages for displaying an image.

Referring to FIG. 15, for example, the memory 1510 may be located inside of the timing controller 140. In another example, the memory 1510 may be located between the timing controller 140 and the data driving circuit 120 or may be disposed in the incorporated integrated circuit SRIC.

Discussions that follow are provided based on examples where the memory 1510 is located inside of the timing controller 140, but embodiments of the present disclosure are not limited thereto.

In this manner, as the touch display device 100 is configured to reduce a length of a touch sensing period, the size of image data DATA stored in the memory 1510 in the touch sensing period can also be reduced.

Accordingly, the memory 1510 having a capacity reduced by the size of the image data DATA may be configured.

Figure 16:
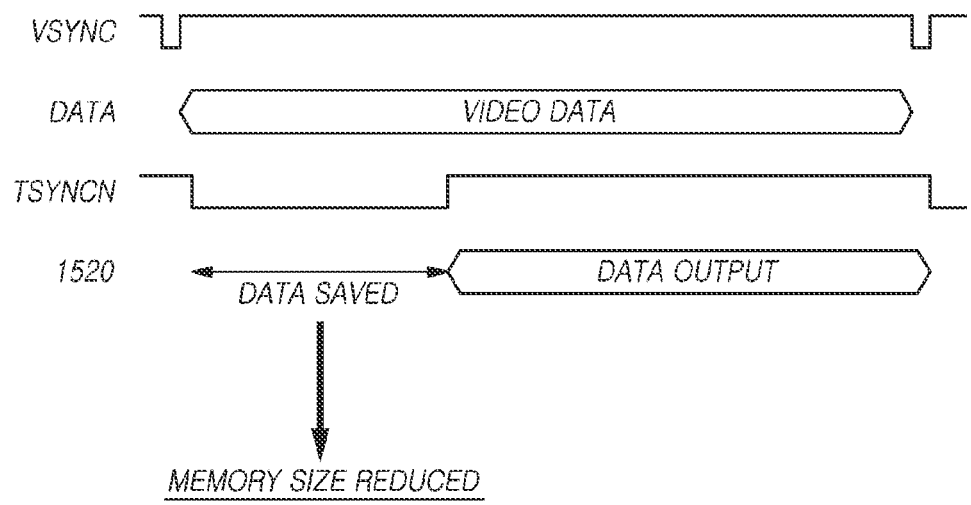
FIG. 16 illustrates an example effect of reducing an amount of memory to be used in the touch display device according to embodiments of the present disclosure.

FIG. 16 illustrates an example effect of allowing a smaller amount of memory to be used in the touch display device 100 according to embodiments of the present disclosure.

As described above, the timing controller can generate image data DATA based on the vertical synchronization signal VSYNC.

In one or more instances, in a period corresponding to a touch sensing period based on the touch synchronization signal TSYNCN, image data DATA may not be output to a line 1520 through which image data is transmitted. During such a period corresponding to the touch sensing period, image data DATA can be stored in the memory.

That is, a length of a period during which new image data DATA is stored in the memory (corresponding to a period DATA SAVED in FIG. 16) can correspond to a length of a touch sensing period based on the touch synchronization signal TSYNCN.

In a display period following the touch sensing period, the image data stored in the memory can be output through the line 1520 through which the image data is transmitted.

By reducing a touch sensing period, the size of image data DATA stored in the memory can be reduced. Thereby, a memory having a smaller capacity can be used.

Figure 17:
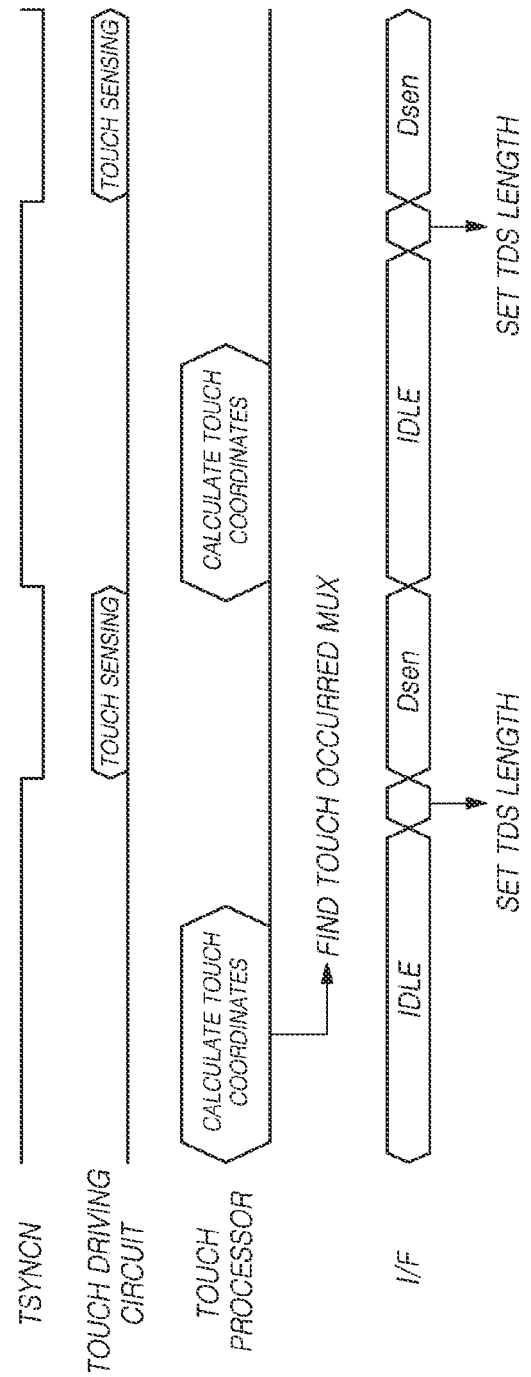
FIG. 17 is an example operation timing diagram of the touch controller in the touch display device according to embodiments of the present disclosure.

FIG. 17 is an example operation timing diagram of the touch controller in the touch display device 100 according to embodiments of the present disclosure.

Referring to FIG. 17, a period in which the touch synchronization signal TSYNCN is at a low level may be allocated to a touch sensing period, and a period in which the touch synchronization signal TSYNCN is at a high level may be allocated to a display period. The level of the touch synchronization signal TSYNCN may vary according to design considerations by a person skilled in the art.

In a touch sensing period, the touch controller 160 can receive touch sensing data from the touch driving circuit 150. A period in which the touch controller 160 receives touch sensing data from the touch driving circuit 150 may partially overlap a display period.

FIG. 17 illustrates, for example, that a period in which the touch controller 160 receives touch sensing data overlaps only a period in which the touch synchronization signal TSYNCN is at a low level (i.e., a touch sensing period). In another example, a timing at which the touch controller 150 starts to receive touch sensing data may overlap a period in which the touch synchronization signal TSYNCN is at a high level. In another example, a timing at which the touch controller 160 finally receives touch sensing data may overlap a period in which the touch synchronization signal TSYNCN is at a high level.

The touch controller 160 can determine the presence or absence of a touch, coordinates of the touch, and/or the like, based on the received touch sensing data. Such an operation of the touch controller 160 may be performed while overlapping with the display period.

The interface line I/F described above may be provided between the touch controller 160 and the touch driving circuit 150.

The interface line I/F may be in an idle mode IDLE during a period in which the touch controller 160 determines the presence or absence of a touch, coordinates of the touch, and/or the like. During this period, data may not be transmitted or received through the interface line I/F.

The touch controller 160 can adjust a length of a sensing sub-period based on the obtained touch coordinates.

For example, the touch controller 160 can control a length of the touch driving signal TDS corresponding to respective obtained touch coordinates for each sensing sub-period by controlling the interface line I/F in the idle mode.

Referring to discussions on the configuration of FIG. 9 described above, the touch controller 160 can control a touch driving signal having a longer length (e.g., the second touch driving signal 820) to be supplied for a sensing sub-period in which it is determined that a touch has been input. Further, the touch controller 160 can control a touch driving signal having a smaller length (e.g., the first touch driving signal 810) to be supplied for a sensing sub-period in which it is determined that a touch has not been input.

The touch controller 160 can receive a digital value Dsen obtained by the touch driving circuit 150 through the interface line I/F.

When the reception of the digital value Dsen from the touch driving circuit 150 is completed, the interface line I/F may return to the idle mode IDLE.

A period in which the touch controller 160 controls a length of a touch driving signal TDS may overlap a touch sensing period based on the touch synchronization signal TSYNCN.

Accordingly, the touch controller 160 can more accurately sense a touch in an area in which it is determined that a touch has been input.

In this manner, a method of locally extending a touch sensing period for an area in which it is determined that a touch has been input may be defined as a "weighted touch sensing method".

Figure 18:
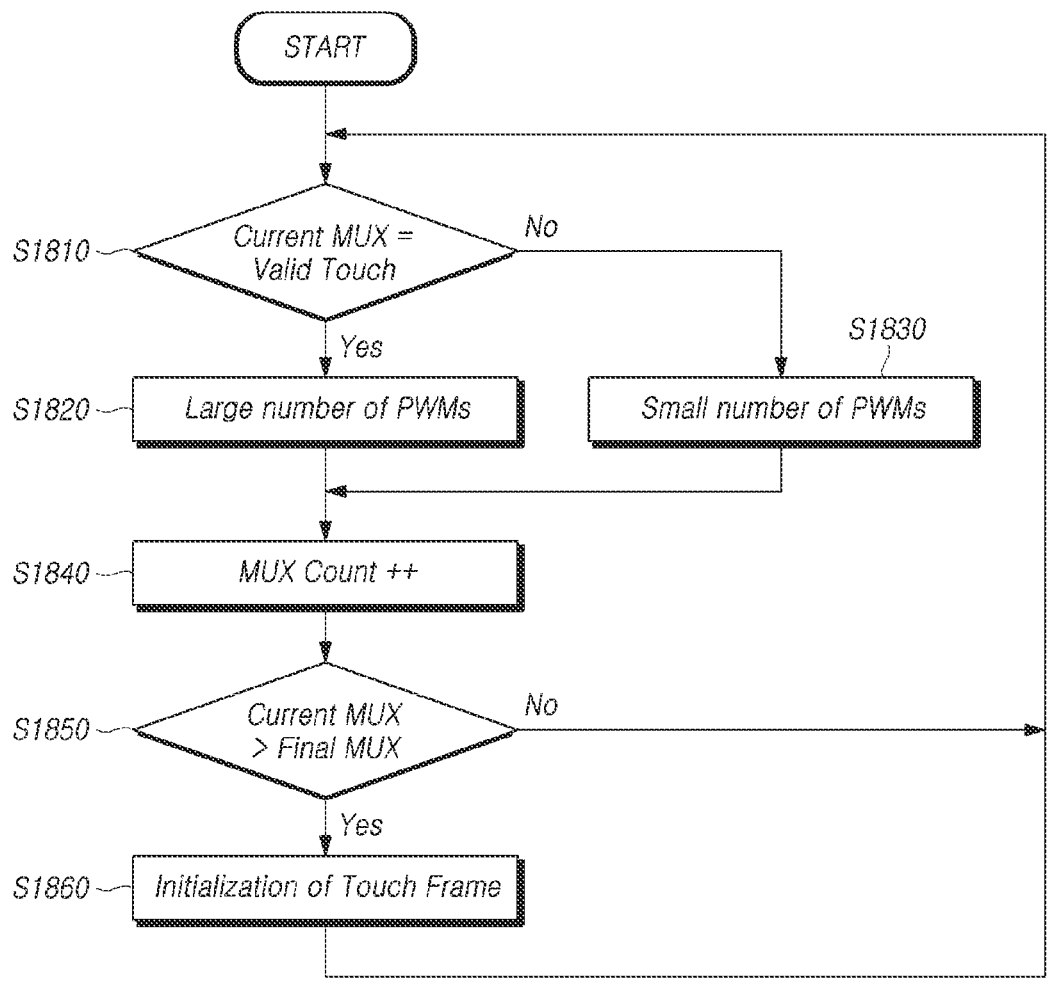
FIG. 18 is an example flowchart for explaining a weighted touch sensing method in the touch display device according to embodiments of the present disclosure.

FIG. 18 is an example flowchart for explaining a weighted touch sensing method in the touch display device 100 according to embodiments of the present disclosure.

The weighted touch sensing method 1800, which may be performed by the touch controller 160, may include determining whether a valid touch has occurred in a current sensing sub-period (Current MUX), at step S1810.

Whether a valid touch has occurred in the current sensing sub-period may correspond to determining whether a valid touch has occurred in one sensing unit. For example, determining whether a valid touch has occurred in one sensing unit may be performed by determining whether a sensed voltage across a row capacitor exceeds a threshold value.

In terms of the touch controller 160, the presence or absence of the valid touch can be determined by determining whether an input digital value exceeds a preset threshold value.

The weighted touch sensing method 1800 by the touch controller 160 may include applying a touch driving signal including a larger number of pulses when it is determined that a valid touch has occurred in the current sensing sub-period, at step S1820.

The weighted touch sensing method 1800 by the touch controller 160 may include applying a touch driving signal including a smaller number of pulses when it is determined that a valid touch has not occurred in the current sensing sub-period, at step S1830.

Thereafter, the weighted touch sensing method 1800 by the touch controller 160 may include changing a sub-period in which touch sensing is to be performed from the current sensing sub-period to a next sensing sub-period, at step S1840.

The weighted touch sensing method 1800 by the touch controller 160 may include determining whether the next sensing sub-period exceeds a preset last sensing sub-period, at step S1850.

The weighted touch sensing method 1800 by the touch controller 160 may include, when it is determined that the next sensing sub-period does not exceed the preset last sensing sub-period, regarding the next sensing sub-period as a current sensing sub-period, and then returning to step S1810 of determining whether a valid touch occurs in the current sensing sub-period.

The weighted touch sensing method 1800 by the touch controller 160 may include, when it is determined that the next sensing sub-period exceeds the preset last sensing sub-period, regarding the current sensing sub-period as a last sensing sub-period, and then initializing the touch process of performing the weighted touch sensing method, at step S1860.

In the step of initializing the touch process S1860, the current sensing sub-period can be initialized. When the sensing sub-period is initialized, the touch process can return to step S1810 of determining whether a valid touch occurs in a current sensing sub-period.

According to the weighted touch sensing method 1800 by the touch controller 160 described above, a touch driving signal having a greater number of pulses can be applied to an area where it is determined that a valid touch has occurred.

Figure 19:
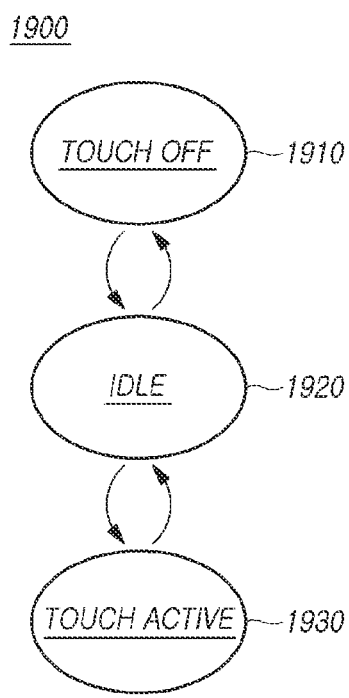
FIG. 19 illustrates example operation modes of the touch display device according to embodiments of the present disclosure.

FIG. 19 illustrates example operation modes 1900 of the touch display device 100 according to embodiments of the present disclosure.

In one or more embodiments, operation modes 1900 of the touch display device 100 may include a touch-off mode 1910, an idle mode 1920, a touch active mode 1930, and the like.

In the touch-off mode 1910, the touch display device 100 may not sense a touch. This mode may represent, for example, a state in which power of the touch display device 100 is off.

The idle mode 1920 may represent a situation where the touch display device 100 operates in a low power mode. For example, in a situation where waking up by a touch on a touch display device 100 operating in a sleep mode, the sleep mode of the touch display device 100 may represent the low power mode.

For example, while the touch display device 100 operates in the idle mode 1920, the touch display device 100 can sense only whether a touch is input; therefore, cannot sense touch coordinates. When a user of the touch display device 100 inputs a touch through an operation of touching a screen of the touch display device 100 once (which may be also referred to as a knock-on operation), the touch display device 100 can be transitioned from the idle mode 1920 to the touch active mode 1930.

The touch active mode 1930 may represent a state in which all of the presence or absence of a touch, coordinates of the touch, and the like can be determined or calculated.

In the touch active mode 1930, a user can input various commands or data to the touch display device 100 through a touch input.

As shown in FIG. 19, the operation modes 1900 of the touch display device 100 can be transitioned to each other. In one or more instances, the touch-off mode 1910 may be transitioned to the touch active mode 1930, or the touch active mode may be transitioned to the touch-off mode 1910.

In the operation modes 1900 of the touch display device 100, the idle mode 1920 may be omitted according to a design consideration.

Figure 20:
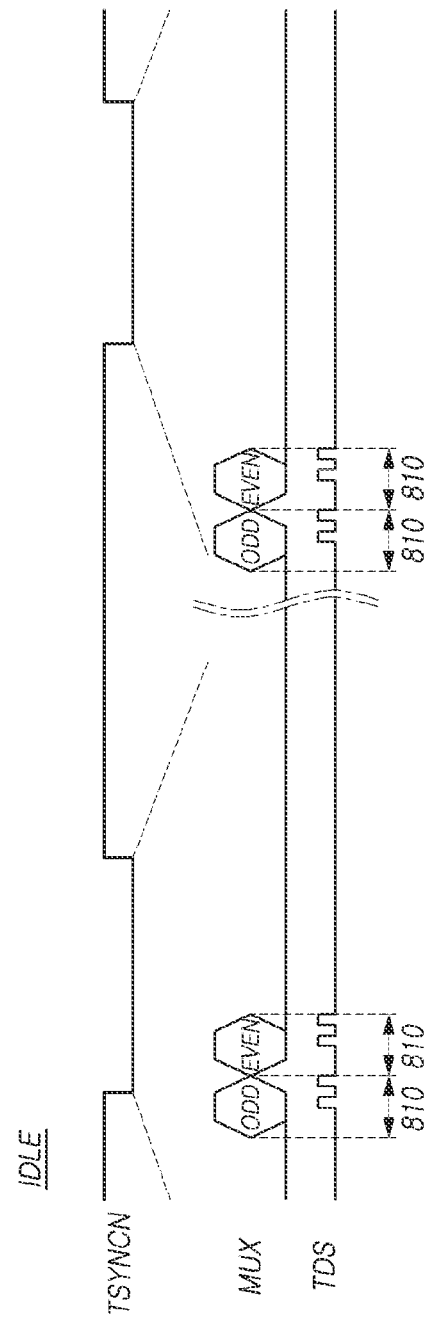
FIG. 20 illustrates an example driving method for sensing whether a touch occurs when the touch display device operates in an idle mode according to embodiments of the present disclosure.

FIG. 20 illustrates an example driving method for sensing whether a touch occurs while the touch display device 100 operates in the idle mode according to embodiments of the present disclosure.

The touch display device 100 according to aspects of the present disclosure can simply sense whether a touch has occurred while reducing power consumption in the idle mode.

Referring to FIG. 20, in one or more embodiments, the touch display device 100 may include a sensing sub-period ODD for sensing touch electrodes located in one or more odd rows and a sensing sub-period EVEN for sensing touch electrodes located in one or more even rows.

The touch display device 100 in the idle mode can be implemented so that a smaller number of touch driving signals TDS can be applied by sensing two or more sensing units at once. However, embodiments of the present disclosure for implementing such a method in which the touch driving signals TDS are concurrently applied in the idle mode are not limited to the example in shown in FIG. 20.

Referring to FIG. 20, the touch display device 100 according to aspects of the present disclosure may allocate m sensing sub-periods in the touch active mode. In this implementation, each of m sensing units may be sensed in a respective one of m sensing sub-periods.

In one or more instances, the touch display device 100 may allocate a smaller number of sensing sub-periods than the m sensing sub-periods in the idle mode distinct from the touch active mode.

In one or more instances, in the idle mode of the touch display device 100, two or more sensing units among the m sensing units can be sensed during one sensing sub-period.

Referring to FIG. 20, in the idle mode, any one sensing sub-period may be a sub-period in which odd-numbered sensing units among the m sensing units are sensed together. Further, in the idle mode, another sensing sub-period may be a sub-period in which even-numbered sensing units among the m sensing units are sensed together.

In this manner, the touch display device 100 can sense all of the m sensing units by allocating a smaller number of sensing sub-periods than the m sensing sub-periods in the idle mode.

Referring to FIG. 20, during a period of operating in the idle mode, a touch driving signal TDS may include a relatively small number of pulses.

For example, a first touch driving signal 810 may be applied in the period of operating in the idle mode.

Figure 21:
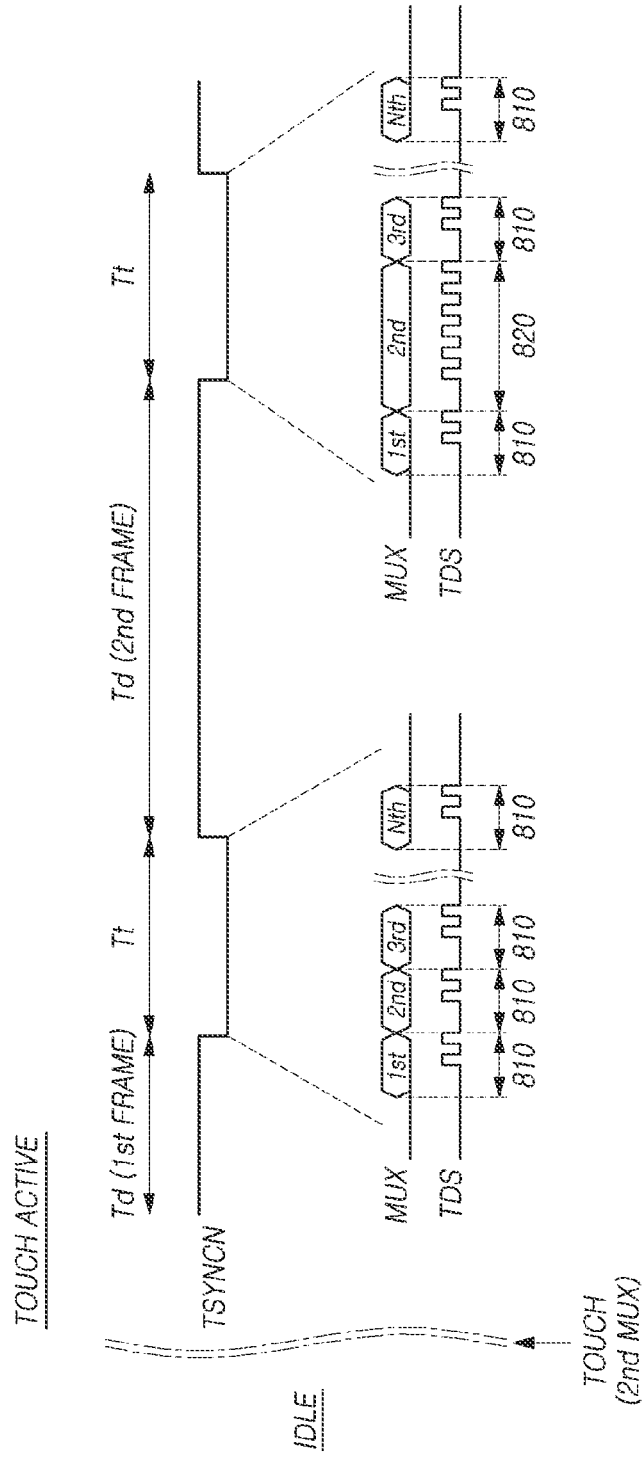
FIG. 21 illustrates an example method of applying a touch driving signal when the touch display device is transitioned from the idle mode to a touch-active mode according to embodiments of the present disclosure.

FIG. 21 illustrates an example method of applying a touch driving signal TDS when the touch display device 100 is transitioned from the idle mode to the touch active mode according to embodiments of the present disclosure.

Referring to FIG. 21, the touch display device 100 may be in a state where the touch display device 100 is transitioned to the touch active mode by receiving a touch input in the idle mode.

When the touch display device 100 is transitioned from the idle mode to the touch active mode, the touch display device can output a first touch driving signal 810 in all sensing sub-periods (e.g., a first sensing sub-period (1st MUX) to an Nth sensing sub-period (Nth MUX)) in a touch sensing period Tt.

Further, based on a touch input in the touch sensing period Tt, the touch display device 100 can determine that a sensing sub-period in which a touch is input is a second sensing sub-period (2nd MUX).

The touch display device 100 can apply a second touch driving signal 820 in a second sensing sub-period (2nd MUX) of a next touch sensing period Tt, and apply a first touch driving signal 810 to the remaining sensing sub-periods.

Accordingly, the touch display device 100 can be transitioned from the idle mode to the touch active mode.

Figure 22:
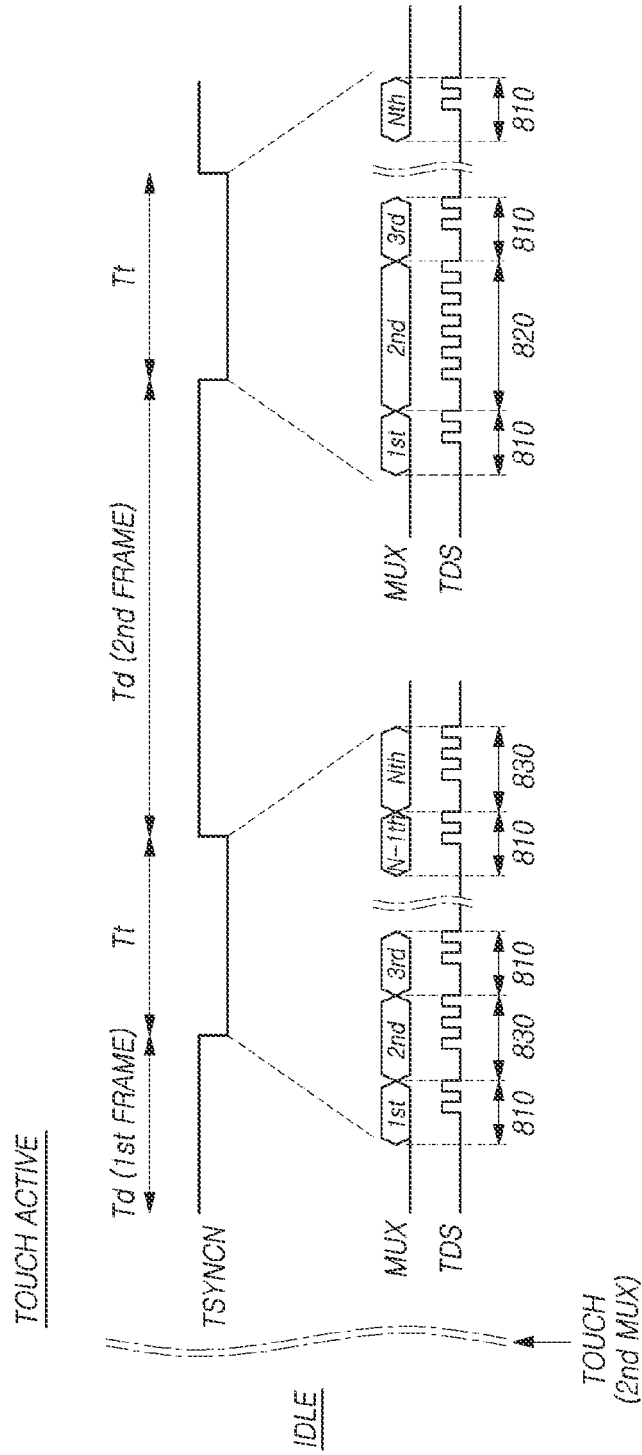
FIG. 22 illustrates another example method of applying a touch driving signal when the touch display device is transitioned from the idle mode to the touch-active mode according to embodiments of the present disclosure.

FIG. 22 illustrates another example method of applying a touch driving signal TDS when the touch display device 100 is transitioned from the idle mode to the touch active mode according to embodiments of the present disclosure.

Compared to FIG. 21, the touch display device 100 can locally supply a third touch driving signal 830 to a touched area in which it is determined that a touch is input in the idle mode.

The third touch driving signal 830 may include a plurality of pulses. A length of the third touch driving signal 830 may be longer than that of the first touch driving signal 810 and shorter than that of the second touch driving signal 820.

Referring to FIG. 22, when a touch is input to an area corresponding to the second sensing sub-period (2nd MUX) in the idle mode, the touch controller 160 can determine that the touch has been input in any one sensing sub-period among even-numbered sensing sub-periods EVEN (see FIG. 20).

When the touch display device 100 is transitioned to the touch active mode, the touch controller 160 can apply a third touch driving signal 830 to even-numbered sensing sub-periods (e.g., the second sensing sub-period (2nd MUX), and the like). Further, the touch controller 160 can apply a first touch driving signal 810 to odd-numbered sensing sub-periods (e.g., the first sensing sub-period (1st MUX), the third sensing sub-period (3rd MUX), and the like).

Accordingly, the touch controller 160 can more accurately determine that a touch has occurred in the second sensing sub-period (2nd MUX), which is one of the even-numbered sensing sub-periods.

In a next touch sensing period Tt, the touch controller 160 can supply the second touch driving signal 820 in the second sensing sub-period (2nd MUX), and supply the first touch driving signal 810 in the remaining sensing sub-periods.

In this manner, the touch controller 160 can be transitioned from the idle mode to the touch active mode, and can quickly identify an area where a touch is input Immediately after transitioning from the idle mode to the touch active mode, a response speed of the touch display device 100 in response to a touch input can be increased.

Figure 23:
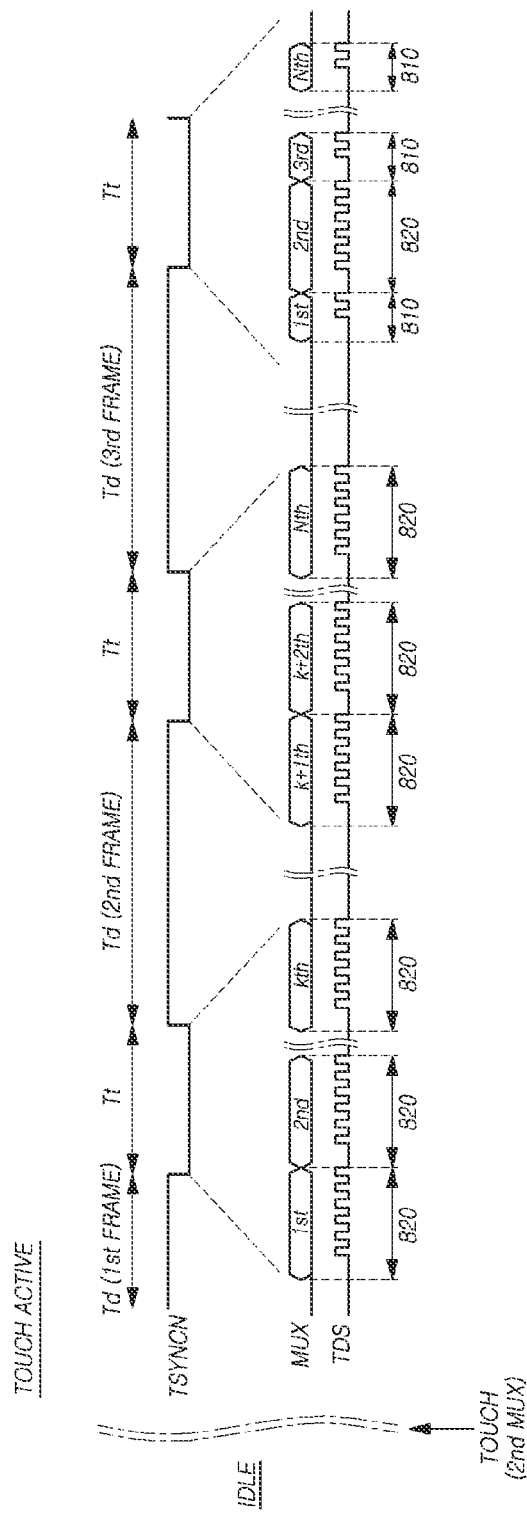
FIG. 23 illustrates yet another example method of applying a touch driving signal when the touch display device is transitioned from the idle mode to the touch-active mode according to embodiments of the present disclosure.

FIG. 23 illustrates yet another example method of applying a touch driving signal TDS when the touch display device 100 is transitioned from the idle mode to the touch active mode according to embodiments of the present disclosure.

Referring to FIG. 23, in one or more embodiments, the touch display device 100 can supply a second touch driving signal 820 for all sensing sub-periods immediately after transitioning from the idle mode to the touch active mode.

In these embodiments, the touch display device 100 can sense all sensing sub-periods over two or more frame periods immediately after transitioning from the idle mode to the touch active mode.

In these embodiments, a length of the touch driving signal TDS may be maintained only for a sensing sub-period in which it is determined that a touch has been sensed, and a pulse length of the touch driving signal TDS may be reduced for one or more sensing sub-periods in which it is determined that a touch has not been sensed.

Referring to FIG. 23, the second touch driving signal 820 may be subsequently supplied for the second sensing sub-periods (2nd MUX) in which it is determined that a touch has been input over two or more frame periods. Further, a first touch driving signal 810 may be applied to the remaining sensing sub-periods in which it is determined that a touch has not been input.

Accordingly, a touch sensing period can be reduced.

According to the embodiments provided herein, a touch display device (i.e., the touch display device 100) can be provided that is capable of reducing a touch sensing period.

According to the embodiments provided herein, a touch display device (i.e., the touch display device 100) can be provided that is capable of reducing a touch sensing period.

The embodiments described above will be briefly described as follows.

According to aspects of the present disclosure, the touch display device 100 can be provided that includes a display panel 110 in which a plurality of subpixels SP are disposed and a plurality of touch electrodes TE overlapping one or more of the plurality of subpixels SP are disposed, and a touch driving circuit 150 configured to supply a touch driving signal TDS including a plurality of pulses to one or more of the plurality of touch electrodes TE, the touch driving circuit 150 being configured to output respective touch driving signals TDS having different numbers of pulses in a first sensing sub-period (1st MUX) and a second sensing sub-period (2nd MUX) in the period of one frame.

In one or more embodiments, the touch display device 100 may include a touch controller 160 (which may be also referred to as a touch processor 160) configured to organize two or more touch electrodes among the plurality of touch electrodes TE as one sensing unit (e.g., a first sensing unit 710, a second sensing unit 720, and the like), and control the touch driving circuit 150 by receiving sensing values Dsen for the plurality of touch electrodes TE from the touch driving circuit 150.

In one or more embodiments, the touch controller 160 of the touch display device 100 can control a first touch driving signal 810 including a smaller number of pulses to be supplied to the sensing unit (e.g., the first sensing unit 710) through which it is determined that a touch has not been input, and control a second touch driving signal 820 including a larger number of pulses to be supplied to the sensing unit (e.g., the second sensing unit 720) through which it is determined that a touch has been input.

In one or more embodiments, the touch display device 100 can organize two or more touch electrodes among the plurality of touch electrodes TE as one sensing unit, supply touch driving signals TDS including a same number of pulses to the two or more touch electrodes TE included in the one sensing unit, and supply respective touch driving signals TDS (e.g., a first touch driving signal 810 and a second touch driving signal 820) including different numbers of pulses to respective touch electrodes TE included different sensing units among the plurality of touch electrodes.

In one or more embodiments, touch driving circuit 150 of the touch display device 100 may further include a multiplexer circuit 510 configured to output a voltage sensed through the sensing unit, an operational amplifier 520 including a first input terminal N1 to which the sensing voltage Vsen output from an output terminal of the multiplexer circuit 510 is input, a second input terminal N2 to which any one touch driving signal TDS among the touch driving signals TDS including different numbers of pulses is input, and an output terminal N3, and an integrator 530 configured to accumulate voltage values output from the output terminal N3 of the operational amplifier 520.

In one or more embodiments, in the touch display device 100, a number of pulses of the any one touch driving signal TDS input to the second input terminal N2 of the operational amplifier 520 may vary according to a sensing unit selected by the multiplexer circuit 510.

In one or more embodiments, in the touch display device 100, the integrator 530 can integrate at different times depending on the number of pulses of the any one touch driving signal TDS input to the second input terminal N2 of the operational amplifier 520.

In one or more embodiments, the touch display device 100 may include a feedback capacitor array 910 connected between the output terminal N3 and the first input terminal N1 of the operational amplifier 520, and including two or more feedback capacitors (e.g., a first feedback capacitor Cfb1, a second feedback capacitor Cfb2, and the like) being connected in parallel, and a first switching element array 920 including one or more switching elements (e.g., a first switching element SWcfb1), respective one end of the one or more switching elements being connected to at least one feedback capacitor among the two or more feedback capacitors.

In one or more embodiments, the number of feedback capacitors included in the feedback capacitor array 910 and the number of switching elements included in the first switching element array 920 may be different from each other.

In one or more embodiments, the first switching element array 910 may include two or more switching elements, and according to the number of pulses of the any one touch driving signal TDS input to the second input terminal N2 of the operational amplifier 520, switching elements to be turned on among the two or more switching elements may be differently controlled.

In one or more embodiments, the touch display device 100 may further include a charge remover 560 electrically connected to the first input terminal N1 of the operational amplifier 520, and the charge remover 560 may include a charge removal capacitor array 1010 in which two or more charge removal capacitors (e.g., a first charge removal capacitor Ccr1, a second charge removal capacitor Ccr2, and the like) are connected in parallel, and a second switching element array 1020 configured to control charging and discharging of the two or more charge removal capacitors.

In one or more embodiments, the second switching element array 1020 may include two or more switching elements (e.g., a first switching element SWccr1, a second switching element SWccr2, and the like), and according to the number of pulses of the touch driving signal TDS input to the second input terminal N2 of the operational amplifier 520, switching elements to be turned on among the two or more switching elements may be differently controlled.

In one or more embodiments, the touch driving circuit 150 may further include a sampling and hold circuit 540 for sampling and storing an integral signal Vint output from the integrator 530, an analog-to-digital converter 550 for sensing a value stored in the sampling and hold circuit 540, a bias current generation block 1220 for supplying a bias current BIAS CURRENT to the analog-to-digital converter 550, and a digital logic 1210 for supplying an analog-to-digital converting clock CLK.ADC to the analog-to-digital converter 550.

In one or more embodiments, in a period in which the analog-to-digital converter 550 samples the integral signal Vint for the sensing unit in which it is determined that a touch has been input, the bias current generation block 1220 can increase a level of the bias current BIAS CURRENT.

In one or more embodiments, in a period in which the analog-to-digital converter 550 samples an integral signal Vint for a sensing unit in which it is determined that a touch has been input, the digital logic 1210 may increase and output a frequency of the analog-to-digital converting clock CLK.ADC.

In one or more embodiments, the display panel 110 of the touch display device 100 may include a plurality of data lines DL for suppling data voltages to the plurality of subpixels SP. The touch display device 100 may further include a data driving circuit 120 for outputting data voltages to the plurality of data lines DL, and a timing controller 140 for transmitting image data to the data driving circuit 120, and a memory 1510 for storing the image data DATA in a period in which the touch driving signals TDS including different numbers of pulses according to sensing units are output.

In one or more embodiments, the touch display device 100 may include, as operation modes 1900, an idle mode 1920 and a touch-active mode 1930, and in the idle mode 1920, two or more sensing units may be sensed together or concurrently.

In one or more embodiments, in the touch display device 100, the first touch driving signal 810 may be applied to the two or more sensing units in the idle mode 1920.

In one or more embodiments, the touch driving circuit 150 of the touch display device 100 can supply a touch driving signal TDS (e.g., the first touch driving signal 810) including a first number of pulses to a first touch electrode among the plurality of touch electrodes TE during the first sensing sub-period (1st MUX), and supply a touch driving signal TDS (e.g., the second touch driving signal 820) including a second number of pulses to a second touch electrode different from the first touch electrode among the plurality of touch electrodes TE during the second sensing sub-period (2st MUX).

In one or more embodiments, the touch driving circuit 150 of the touch display device 100 can supply the touch driving signal TDS (e.g., the first touch driving signal 810) including the first number of pulses to the first touch electrode and the second touch electrode in a period of operating in the idle mode 1920, and in a period of operating in the touch-active mode 1930 transitioned from the idle mode 1920, supply the touch driving signal TDS (e.g., the first touch driving signal 810) including the first number of pulses to the first touch electrode and supply the touch driving signal TDS (e.g., the second touch driving signal 820) including the second number of pulses to the second touch electrode, the second number of pulses being greater than the first number of pulses.

In one or more embodiments, the touch driving circuit 150 of the touch display device 100 can supply the touch driving signal TDS (e.g., the first touch driving signal 810) including the first number of pulses to the first touch electrode and the second touch electrode in a first frame period (e.g., 1st FRAME, see FIG. 21) after transitioning from the idle mode 1920 to the touch-active mode 1930, and in a second frame period (e.g., 2nd FRAME, see FIG. 21) after transitioning from the idle mode 1920 to the touch-active mode 1930, supply the touch driving signal TDS (e.g., the first touch driving signal 810) including the first number of pulses to the first touch electrode and supply the touch driving signal TDS (e.g., the second touch driving signal 820) including the second number of pulses to the second touch electrode.

In one or more embodiments, the touch driving circuit 150 of the touch display device 100 can supply the touch driving signal TDS (e.g., the first touch driving signal 810) including the first number of pulses to the first touch electrode and supply a touch driving signal TDS (e.g., a third touch driving signal 830) including a third number of pulses to the second touch electrode, in a first frame period (e.g., 1st FRAME, see FIG. 22) after transitioning from the idle mode 1920 to the touch-active mode 1930, and in a second frame period (e.g., 2nd FRAME, see FIG. 22) after transitioning from the idle mode 1920 to the touch-active mode 1930, supply the touch driving signal TDS (e.g., the first touch driving signal 810) including the first number of pulses to the first touch electrode and supply the touch driving signal TDS (e.g., the second touch driving signal 820) including the second number of pulses to the second touch electrode, the third number of pulses being greater than the first number of pulses and less than the second number of pulses.

In one or more embodiments, when a magnitude or intensity of a touch sensing signal TSS input from the second touch electrode to the touch driving circuit 150 is changed, the touch driving circuit 150 of the touch display device 100 can supply the touch driving signal (e.g., the first touch driving signal 810) including the first number of pulses to the second touch electrode.

In one or more embodiments, when a magnitude or intensity of a touch sensing signal TSS input from the first touch electrode to the touch driving circuit 150 is changed, the touch driving circuit 150 of the touch display device 100 can supply the touch driving signal (e.g., the second touch driving signal 820) including the second number of pulses to the first touch electrode.

According to the embodiments provided herein, a weighted touch sensing method 1800 of a touch controller may include determining whether a valid touch is input in one sensing unit, at step S1810, controlling a touch driving circuit 150 to supply a first touch driving signal 810 having a smaller number of pulses to the one sensing unit when it is determined that the valid touch has not been input in the one sensing unit, at step S1830, and controlling the touch driving circuit 150 to supply a second touch driving signal 820 having a larger number of pulses in the one sensing unit when it is determined that the valid touch has been input in the one sensing unit, at step S1820.

In one or more embodiments, the touch controller 160 can control the touch driving circuit 150 to supply touch driving signals including different numbers of pulses (e.g., a first touch driving signal 810 and a second touch driving signal 820) to respective sensing units including two or more touch electrodes TE among a plurality of touch electrodes.

In one or more embodiments, the touch display device 100 may include the touch controller 160 for performing the weighted touch sensing method 1800. In these embodiments, the touch display device 100 can have capability of performing the weighted touch sensing method 1800.

In one or more embodiments, the touch display device 100 may include the touch controller 160 capable of performing the weighted touch sensing method 1800. In these embodiments, the touch display device 100 can have capability of performing the weighted touch sensing method 1800.

The above description has been presented to enable any person skilled in the art to make, use and practice the technical features of the present invention, and has been provided in the context of a particular application and its requirements as examples. Various modifications, additions and substitutions to the described embodiments will be readily apparent to those skilled in the art, and the principles described herein may be applied to other embodiments and applications without departing from the scope of the present invention. The above description and the accompanying drawings provide examples of the technical features of the present invention for illustrative purposes only. That is, the disclosed embodiments are intended to illustrate the scope of the technical features of the present invention.

What is claimed is:

1. A touch display device comprising: a display panel including a plurality of subpixels and a plurality of touch electrodes overlapping one or more of the plurality of subpixels; and a touch driving circuit configured to supply a touch driving signal including a plurality of pulses to one or more of the plurality of touch electrodes, wherein the touch driving circuit is configured to output respective touch driving signals having different numbers of pulses in at least two sensing sub-periods in each of at least one touch sensing period in one frame period that includes the at least one touch sensing period and at least one display period, the at least two sensing sub-periods being defined such that any display period is not interposed between the at least two sensing sub-periods within each of the at least one touch sensing period in one frame period, wherein two or more touch electrodes among the plurality of touch electrodes are organized as one sensing unit, wherein when a touch is applied to a first sensing unit among at least two sensing units, the at least two sensing sub-periods are adjusted such that a length of a second sensing sub-period among the at least two sensing sub-periods during which the touch driving signal is supplied to a second sensing unit to which a touch is not applied is less than a length of a first sensing sub-period during which the touch driving signal is supplied to the first sensing unit, and wherein the at least one display period is increased by a reduced length of the second sensing sub-period such that an entire display period allocated for display driving in one frame period is increased relative to the reduction of an entire touch period allocated for touch sensing in one frame period.

2. The touch display device of claim 1, further comprising: a touch controller configured to organize the one sensing unit, and control the touch driving circuit by receiving sensing values for the plurality of touch electrodes from the touch driving circuit, wherein the touch controller controls a first touch driving signal including a smaller number of pulses to be supplied to the second sensing unit in which the touch is not input and controls a second touch driving signal including a larger number of pulses than the first touch driving signal to be supplied to the first sensing unit in which the touch is input.

3. The touch display device of claim 1,
wherein touch driving signals comprising a same number of pulses are supplied to the two or more touch electrodes included in the one sensing unit, and respective touch driving signals including different numbers of pulses are supplied to respective touch electrodes included in different sensing units among the plurality of touch electrodes, respectively.

4. The touch display device of claim 3, wherein the touch driving circuit comprises:
a multiplexer circuit configured to output a voltage sensed through the sensing unit;
an operational amplifier comprising a first input terminal to which the sensing voltage output from an output terminal of the multiplexer circuit is input, a second input terminal to which any one touch driving signal among the touch driving signals including different numbers of pulses is input, and an output terminal; and an integrator configured to accumulate voltage values output from the output terminal of the operational amplifier.

5. The touch display device of claim 4, wherein a numbers of pulses of the any one touch driving signal input to the second input terminal of the operational amplifier vary according to a sensing unit selected by the multiplexer circuit.

6. The touch display device of claim 4, wherein the integrator integrates at different times depending on a number of pulses of the any one touch driving signal input to the second input terminal of the operational amplifier.

7. The touch display device of claim 4, further comprising:

a feedback capacitor array connected between the output terminal and the first input terminal of the operational amplifier, the feedback capacitor array including two or more feedback capacitors connected in parallel; and a first switching element array comprising one or more switching elements, respective one end of the one or more switching elements connected to at least one feedback capacitor among the two or more feedback capacitors.

8. The touch display device of claim 7, wherein a number of feedback capacitors included in the feedback capacitor array and a number of switching elements included in the first switching element array are different from each other.

9. The touch display device of claim 7, wherein the first switching element array comprises two or more switching elements, and according to a number of pulses of the any one touch driving signal input to the second input terminal of the operational amplifier, switching elements to be turned on among the two or more switching elements are differently controlled.

10. The touch display device of claim 4, further comprising:

a charge remover electrically connected to the first input terminal of the operational amplifier, the charge remover comprising:

a charge removal capacitor array in which two or more charge removal capacitors are connected in parallel; and a second switching element array configured to control charging and discharging of the two or more charge removal capacitors.

11. The touch display device of claim 10, wherein the second switching element array comprises two or more switching elements, and according to a number of pulses of the any one touch driving signal input to the second input terminal of the operational amplifier, switching elements to be turned on among the two or more switching elements are differently controlled.

12. The touch display device of claim 4, wherein the touch driving circuit further comprises:

a sampling and hold circuit configured to sample and store an integral signal output from the integrator;

an analog-to-digital converter configured to sense a value stored in the sampling and hold circuit;

a bias current generation circuit configured to supply a bias current to the analog-to-digital converter; and a digital logic circuit configured to supply an analog-to-digital converting clock to the analog-to-digital converter.

13. The touch display device of claim 12, wherein in a period in which the analog-to-digital converter samples the integral signal for the sensing unit in which it is determined that a touch has been input, the bias current generation circuit increases a level of the bias current.

14. The touch display device of claim 12, wherein in a period in which the analog-to-digital converter samples the integral signal for the sensing unit in which it is determined that a touch has been input, the digital logic circuit increases a frequency of the analog-to-digital converting clock.

15. The touch display device of claim 4, wherein the display panel comprises a plurality of data lines configured to supply data voltages to the plurality of subpixels, and wherein the touch display device comprises:

a data driving circuit configured to output data voltages to the plurality of data lines;

a timing controller configured to transmit image data to the data driving circuit; and a memory configured to store the image data in a period in which the touch driving signals including different numbers of pulses according to sensing units are output.

16. The touch display device of claim 2, wherein the touch display device comprises, as operation modes, an idle mode and a touch-active mode, and in the idle mode, two or more sensing units are sensed together.

17. The touch display device of claim 16, wherein in the idle mode, the first touch driving signal is applied to the two or more sensing units.

18. The touch display device of claim 16, wherein the touch driving circuit supplies a touch driving signal including a first number of pulses to a first touch electrode among the plurality of touch electrodes during the first sensing sub-period, and supplies a touch driving signal including a second number of pulses to a second touch electrode different from the first touch electrode among the plurality of touch electrodes during the second sensing sub-period.

19. The touch display device of claim 18, wherein the touch driving circuit supplies the touch driving signal including the first number of pulses to the first touch electrode and the second touch electrode in a period of operating in the idle mode, and in a period of operating in the touch-active mode transitioned from the idle mode, supplies the touch driving signal including the first number of pulses to the first touch electrode and supplies the touch driving signal including the second number of pulses to the second touch electrode, and wherein the second number of pulses is greater than the first number of pulses.

20. The touch display device of claim 19, wherein the touch driving circuit supplies the touch driving signal including the first number of pulses to the first touch electrode and the second touch electrode in a first frame period after transitioning from the idle mode to the touch-active mode, and in a second frame period after transitioning from the idle mode to the touch-active mode, supplies the touch driving signal including the first number of pulses to the first touch electrode and supplies the touch driving signal including the second number of pulses to the second touch electrode.

21. The touch display device of claim 19, wherein the touch driving circuit supplies the touch driving signal including the first number of pulses to the first touch electrode and supplies a touch driving signal including a third number of pulses to the second touch electrode, in a first frame period after transitioning from the idle mode to the touch-active mode, and in a second frame period after transitioning from the idle mode to the touch-active mode, supplies the touch driving signal including the first number of pulses to the first touch electrode and supplies the touch driving signal including the second number of pulses to the second touch electrode, wherein the third number of pulses is greater than the first number of pulses and less than the second number of pulses.

22. The touch display device of claim 19, wherein the touch driving circuit supplies the touch driving signal including the second number of pulses to the first touch electrode and the second touch electrode, in a first frame period after transitioning from the idle mode to the touch-active mode, and in a second frame period after transitioning from the idle mode to the touch-active mode, supplies the touch driving signal including the first number of pulses to the first touch electrode and supplies the touch driving signal including the second number of pulses to the second touch electrode.

23. The touch display device of claim 18, wherein when a magnitude or intensity of a touch sensing signal input from the second touch electrode to the touch driving circuit is changed, the touch driving circuit supplies the touch driving signal including the first number of pulses to the second touch electrode.

24. The touch display device of claim 18, wherein when a magnitude or intensity of a touch sensing signal input from the first touch electrode to the touch driving circuit is changed, the touch driving circuit supplies the touch driving signal including the second number of pulses to the first touch electrode.

25. A weighted touch sensing method of a touch controller controlling a touch driving circuit configured to supply touch driving signals including different numbers of pulses to respective sensing units including two or more touch electrodes among a plurality of touch electrodes in at least two sensing sub-periods in each of at least one touch sensing period in one frame period that includes the at least one touch sensing period and at least one display period, the weighted touch sensing method comprising:

determining whether a valid touch is input in one sensing unit;

controlling the touch driving circuit to supply a first touch driving signal including a smaller number of pulses to the one sensing unit when it is determined that the valid touch is not input in the one sensing unit; and controlling the touch driving circuit to supply a second touch driving signal including a larger number of pulses in the one sensing unit when it is determined that the valid touch is input in the one sensing unit, wherein the at least two sensing sub-periods are defined such that any display period is not interposed between the at least two sensing sub-periods within each of the at least one touch sensing period in one frame period, wherein the at least two sensing sub-periods are adjusted such that a length of a first sensing sub-period among the at least two sensing sub-periods in which the touch driving signal is supplied to a sensing unit in which the valid touch is not input is less than a length of a second sensing sub-period among the at least two sensing sub-periods in which the touch driving signal is supplied to a sensing unit in which the valid touch is input, and wherein the at least one display period is increased by a reduced length of the second sensing sub-period such that an entire display period allocated for display driving in one frame period is increased relative to the reduction of an entire touch period allocated for touch sensing in one frame period.

\* \* \* \* \*